United States Patent
Vaughn

(10) Patent No.: US 10,086,303 B2
(45) Date of Patent: Oct. 2, 2018

(54) TOY FIGURE WITH AN ENLARGED HAND IN COMMUNICATION WITH AN AUDIO DEVICE

(71) Applicant: Kevin Vaughn, Scottsdale, AZ (US)

(72) Inventor: Kevin Vaughn, Scottsdale, AZ (US)

(73) Assignee: BUDDY WORLD LLC, Scottsdale, AZ (US)

( * ) Notice: Subject to any disclaimer, the term of this patent is extended or adjusted under 35 U.S.C. 154(b) by 0 days.

(21) Appl. No.: 15/495,963

(22) Filed: Apr. 24, 2017

(65) Prior Publication Data
US 2018/0021686 A1    Jan. 25, 2018

Related U.S. Application Data

(63) Continuation-in-part of application No. 29/562,219, filed on Apr. 22, 2016, and a continuation-in-part of application No. 29/562,220, filed on Apr. 22, 2016, and a continuation-in-part of application No. 29/562,221, filed on Apr. 22, 2016, and a
(Continued)

(51) Int. Cl.
| | | |
|---|---|---|
| A63H 3/28 | (2006.01) |
| A63H 3/48 | (2006.01) |
| A63H 3/36 | (2006.01) |
| A63H 3/46 | (2006.01) |
| A63H 3/52 | (2006.01) |
| A63H 5/00 | (2006.01) |
| H04W 88/02 | (2009.01) |
| G06Q 30/02 | (2012.01) |

(52) U.S. Cl.
CPC ............... *A63H 3/28* (2013.01); *A63H 3/36* (2013.01); *A63H 3/46* (2013.01); *A63H 3/48* (2013.01); *A63H 3/52* (2013.01); *G06Q 30/0267* (2013.01); *H04W 88/02* (2013.01)

(58) Field of Classification Search
CPC ... A63H 3/00; A63H 3/20; A63H 3/28; A63H 3/46; A63H 3/48; A63H 5/00; A63H 13/00; A63H 33/26; A63F 2300/6072; A63F 13/00; A63F 13/54; A63F 23/30
USPC ........ 446/297–298, 268, 334, 336, 327–328, 446/390, 484, 486
See application file for complete search history.

(56) References Cited

U.S. PATENT DOCUMENTS

| | | | | |
|---|---|---|---|---|
| 4,161,082 A | * | 7/1979 | Alexander | ............... A63H 3/36 446/352 |
| 4,820,229 A | * | 4/1989 | Spraggins | ................ A63H 5/00 446/26 |

(Continued)

*Primary Examiner* — Kien Nguyen

(57) ABSTRACT

A model figure has a body comprising a pair of legs each of which is connected to a foot and a torso, a head connected to the body, a pedestal connected to at least one foot, and an audio device inside of the pedestal. The model figure also has an arm connected to the torso, a glide connected to a distal end of the arm, and a post connected to the guide, wherein the post extends from the guide and away from the arm. The model figure has a contact on a distal end of the post, said contact in communication with the audio device, and a spring surrounding the post and the contact, a length of the spring in an uncompressed state is longer that a total length of the post and the contact. In addition, the model figure has an oversized hand comprising a keyhole in a back of the hand, said keyhole configured to slide over the glide.

20 Claims, 26 Drawing Sheets

Related U.S. Application Data continuation-in-part of application No. 29/562,222, filed on Apr. 22, 2016.

(60) Provisional application No. 62/326,668, filed on Apr. 22, 2016.

(56) References Cited

U.S. PATENT DOCUMENTS

| | | | | |
|---|---|---|---|---|
| 4,950,200 | A * | 8/1990 | Curran | A63H 3/28 446/302 |
| 5,356,330 | A * | 10/1994 | Cohen | A63B 23/12 446/390 |
| 6,296,543 | B1 * | 10/2001 | Andrews | A63F 7/0668 446/297 |
| 6,461,217 | B1 * | 10/2002 | Pestonji | A63H 3/28 446/297 |
| 9,259,659 | B2 * | 2/2016 | Sopinsky | A63H 13/06 |
| 2011/0034103 | A1 * | 2/2011 | Fong | A63H 3/28 446/297 |

* cited by examiner

TOY FIGURE WITH AN ENLARGED HAND IN COMMUNICATION WITH AN AUDIO DEVICE

CROSS-REFERENCED APPLICATIONS

This patent application claims priority to and the benefit of Provisional Patent Application Ser. No. 62/326,668, filed Apr. 22, 2015, entitled A Toy Figure with an Enlarged Hand in Communication with an Audio Device, which is incorporated by reference herein.

This patent application is a continuation in part of Design patent application Ser. No. 29562219, filed Apr. 22, 2015, entitled Arm Assembly for a boy, a Doll and/or a Figurine, which is incorporated by reference herein.

This patent application is a continuation in part of Design patent application Ser. No. 29562220, filed Apr. 22, 2015, entitled Arm Assembly for a Toy, a Doll and/or a Figurine, which is incorporated by reference herein.

This patent application is a continuation in part of Design patent application Ser. No. 29562221, filed Apr. 22, 2015, entitled Arm Assembly for a Toy, a Doll and/or a Figurine, which is incorporated by reference herein.

This patent application is a continuation in part of Design patent application Ser. No. 29562222, filed Apr. 22, 2015, entitled Arm Assembly for a Toy, a Doll and/or a Figurine, which is incorporated by reference herein.

BACKGROUND

Figurines have been collected by people over the last few hundred years. Traditionally, figurines have been made porcelain or other ceramics. About a hundred years ago, plastics became a common material for figurines, which decreased costs of manufacture and increased the durability. Figurines or model figures have become commonplace. Collectors have many choices of figurines from action figures to sports heroes and from sci-fi/fantasy to Hummels.

More recently, the bobble-head has become a common type of a collectable figurine. In the 1960, Major League Baseball produced a series of player-specific bobble-heads. Over the next 15 years there was a bobble head craze, which moved into other sports, cartoon characters, as well as, rock and roll stars. About 20 years ago, the bobble-head returned and has become a standard promotional item that is given away at sporting events.

However, the industry has a newel for new and novel figurines, which could be used as promotional items for sporting events, movie releases, gift stores at amusement parks, and conventions.

SUMMARY

Various embodiments provide a model figure configured to provide audio feedback from a fist bump. The model figure can comprise a body composing a pair of legs each of which is connected to a foot and a torso; a head connected to the body; a pedestal connected to at least one foot an audio device inside of the pedestal; an arm connected to the torso; a glide connected to a distal end of the arm; a post connected to the guide, wherein the past extends from the guide and away from the arm; a contact on a distal end of the post, the contact in communication with the audio device; a spring surrounding the post and the contact, a length of the spring in an uncompressed state is longer that a total length of the post and the contact; and an oversized hand comprising a keyhole in a back of the hand, said keyhole configured to slide over the glide.

Some embodiments provide a method of providing an audio clip from a fist bump to the figurine. The method cm comprise the step of applying a force to a surface of the fist of the figurine, compressing the spring, triggering the contact to send a signal to an audio device, wherein the signal activates the audio device to provide an audio clip through a speaker in the figurine.

Some embodiments provide a of delivering advertising. The method can include the steps of providing a model figure; applying a force to a front surface of a fist of the model figure; compress a spring located in the fist; and triggering a contact which sends a signal that activates an audio device to provide an audio advertisement through a speaker in the model figure.

Some methods can include the steps of providing an app downloadable to a smart device; downloading the app to the smart phone; communicating with the audio device via the app loaded on the star phone; downloading additional audio clips to the audio device through the app; and updating an advertising message in the memory of the audio device. The methods can also include the steps of providing a coupon to a user through the app; and announcing the new coupon in an audio clip downloaded to the audio device and played on the speaker of the model figure.

Other configurations of the figurine and methods of use thereof will be apparent in the disclosure of the specifications and drawings herein.

DRAWINGS

The present disclosure will become more fully understood from the description and the accompanying, drawings, wherein.

Figure 1:
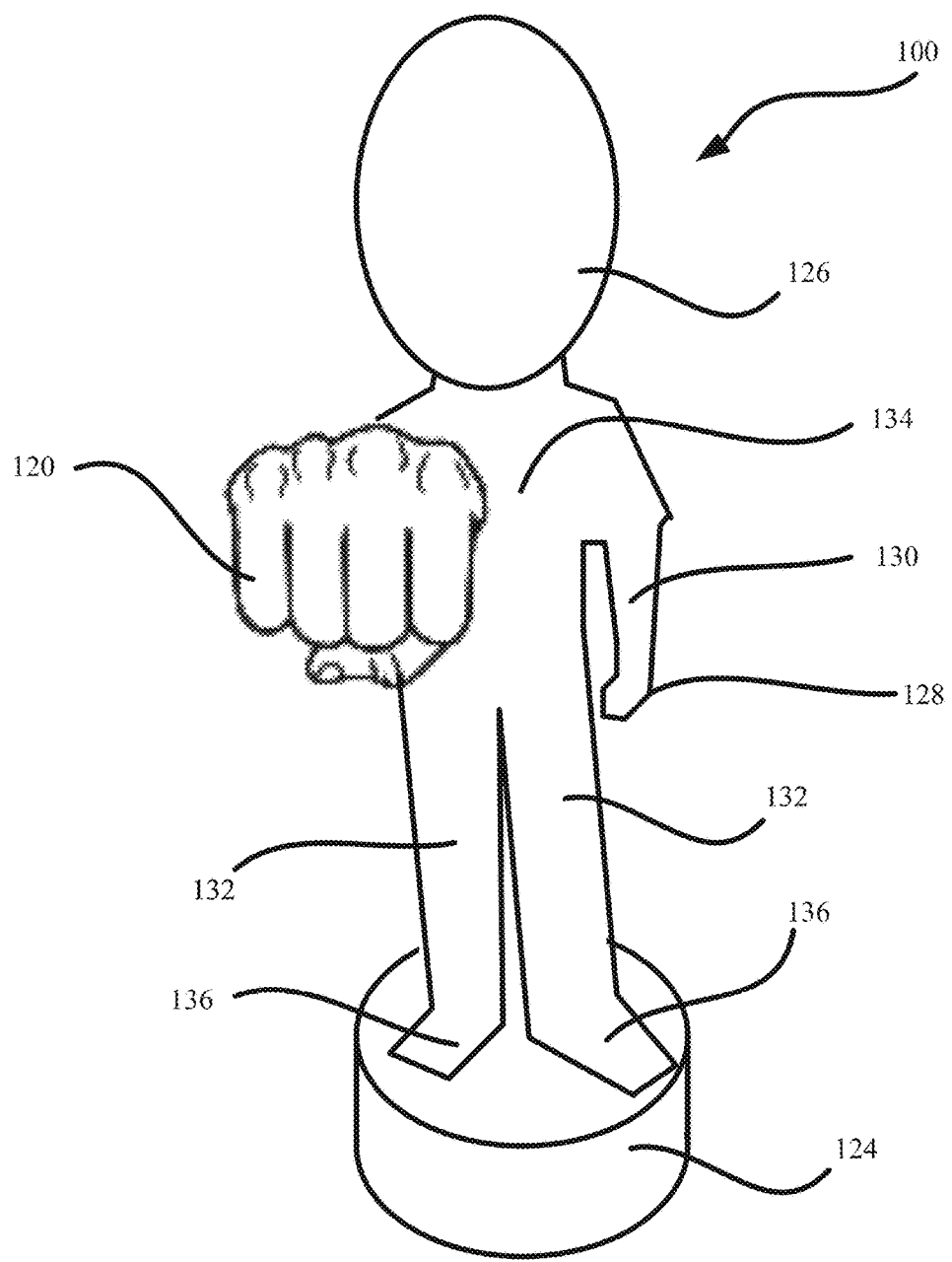
FIG. 1 is a front view of a figurine, in accordance with various embodiments.
Figure 2:
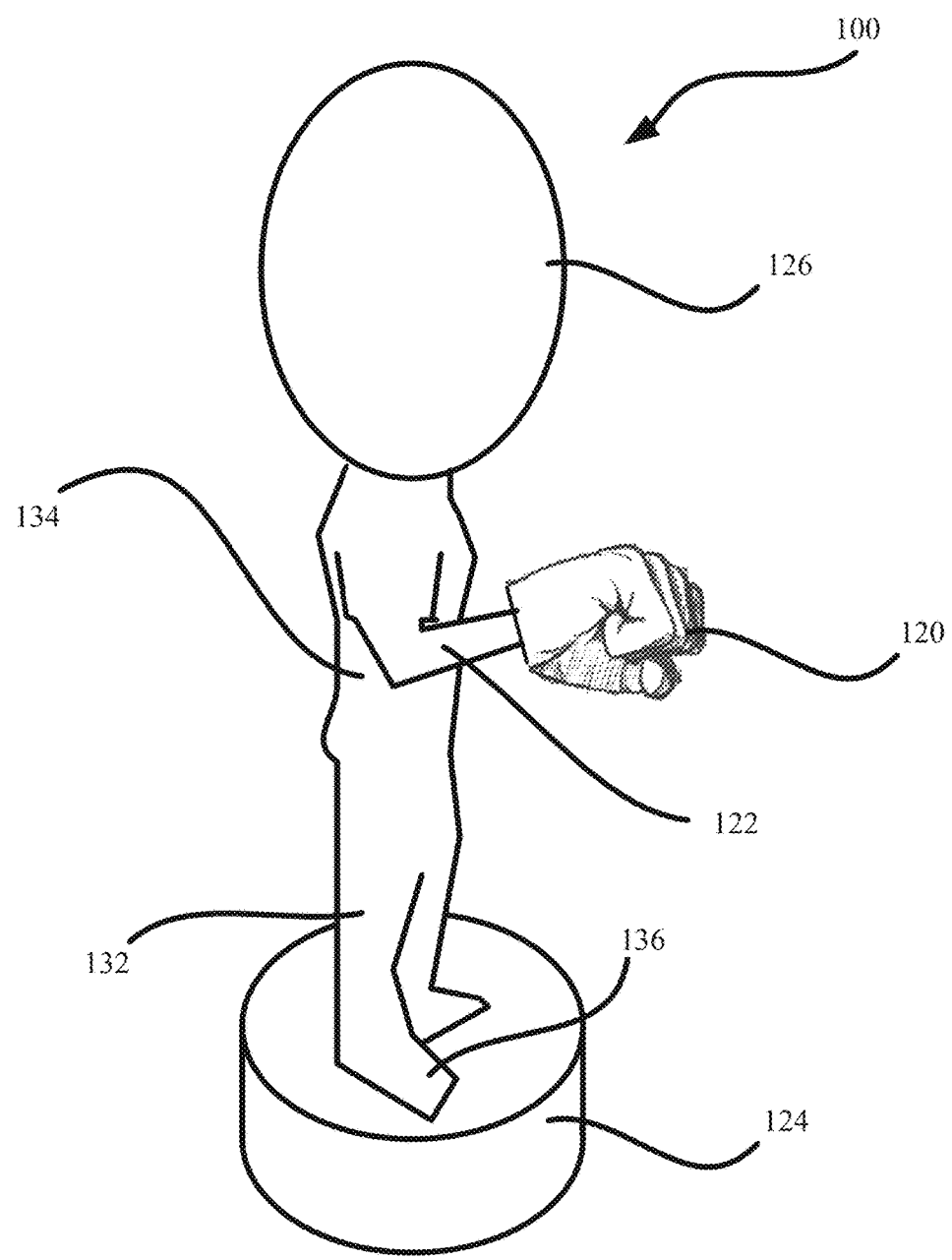
FIG. 2 is a side view from the ell side of the figurine, as illustrated in FIG. 1, in accordance with various embodiments.
Figure 3:
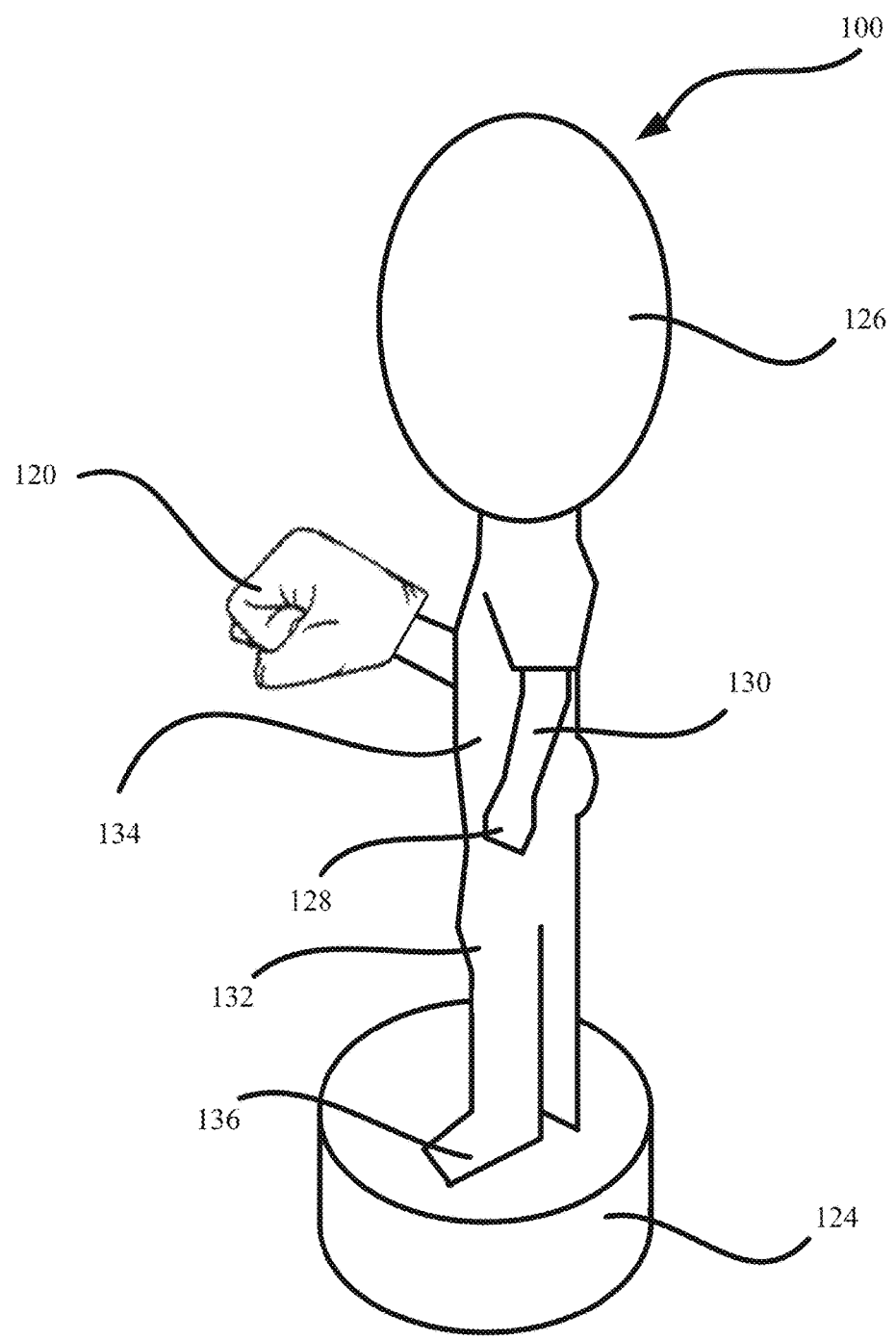
FIG. 3 is a side view from the right side of the figurine, as illustrated in FIG. 1, in accordance with various embodiments.

The drawings described herein are for illustrative purposes only of selected embodiments and not all possible implementations, and are not intended to limit the scope of any of the exemplary embodiments disclosed herein or any equivalents thereof. It is understood that the drawings are not drawn to scale. For purposes of clarity, the same reference numbers will be used in the drawings to identify similar elements.

DESCRIPTION

The following description is merely exemplary in nature and is in no way intended to limit the exemplary embodiments, their application, or uses. It should be understood that steps within a method may be executed in different order without altering the principles of the present disclosure. For example, various embodiments may be described herein in terms of various functional components and processing steps. It should be appreciated that such components and steps may be realized by any number of hardware components configured to perform the specified functions.

Various embodiments provided a model figure comprising: a body comprising a pair of legs each of which is connected to a foot and a torso; a head connected to the body; a pedestal connected to at least one foot; an audio device inside of the pedestal; an arm connected to the torso; a glide connected to a distal end of the arm; a post connected to the guide, wherein the post extends from the guide and away from the arm; a contact on a distal end of the post, the contact in communication with the audio device; a spring surrounding the post and the contact, a length of the spring in an uncompressed state is longer that a total length of the post and the contact; and an oversized hand comprising a keyhole in a back of the hand, said keyhole configured to slide over the glide.

In some embodiments, the oversized hand is configured s a fist. In some embodiments, the oversized hand is at least four times greater than an anatomically correct hand connected to the arm assembly. The glide can comprise at least one stabilizer and the keyhole is configured to accept the at least one stabilizer. In some variations, the model figure can have at least one spring configured to connect the head to the body as a bobble head.

The hand can be holding a hockey stick, a helmet, a mask, a glove, a tennis racquet, a ping pong paddle, a golf club, or a baseball bat. In some embodiments, the oversized hand is configured as a glove. The glove can be a hockey glove, a boxing glove, a baseball mitt, a golf glove, a snowboarding mitten, a mountain bike glove, or a mixed martial arts glove.

In some embodiments, the model figure further comprises: a second a glide connected to a distal end of the other arm on the body; a second post connected to the guide, wherein the second post extends from the second guide and away from the other arm; a second contact on a distal end of the second post, said second contact in communication with the audio device, a second spring surrounding the second post and the second contact, a length of the second spring in an uncompressed state icy longer that a total length of the second post and the second contact; and a second oversized hand comprising second keyhole in a back of the second hand, said second keyhole configured to slide over the second glide. The second glide can comprise at least one stabilize and the second keyhole is configured to accept the at least one stabilizer.

Some embodiments provide a method of providing a sound clip from a model figure. The method can include the steps of providing the model figure comprising an enlarged hand; applying a force to a front surface of the enlarged hand; compressing a spring inside of the enlarged hand; and triggering a contact, wherein the contact sends a signal to an audio device, wherein the signal activates the audio device to provide an audio clip through a speaker in the model figure.

In some methods, the model figure comprises: an arm assembly; a glide on the end of the arm assembly, wherein a surface area of a cross-section of the glide is at least twice a surface area of the arm assembly, the glide further comprises a contact on a post and in communication with an audio device; an enlarged hand comprising keyhole in the rear of the enlarged hard and configured to slide on the glide, wherein the enlarged hand is at least four times bigger proportionally as compared to a size of a hand that normally fits on the arm assembly; and a spring surrounding the post and preventing an inner wall of the keyhole from triggering the contact.

In some methods, the model figure further comprises: a second arm assembly; a second glide on the end of the second arm assembly, wherein a surface area of a cross-section of the second glide is at least twice a surface area of the second arm assembly, the second glide further comprises a second contact on a second post and in communication with the audio device; a second enlarged hand comprising a second keyhole in the rear of the second enlarged hand and configured to slide on the second elide, wherein the second enlarged hand is at least four times bigger proportionally as compared to a size of a hand that normally fits on the second arm assembly; and a second spring surrounding the second post and preventing an inner wall of the second keyhole from triggering the second contact.

The method can include the steps of applying a force to a front surface of the second enlarged hand; compressing the second spring; and triggering the second contact, wherein the second contact sends a second signal to the audio device, wherein the second signal activates the audio device to provide an audio dip through the speaker in the model figure.

Some embodiments provide a method of delivering advertising. The method can include the steps of providing a model figure; applying a force to a front surface of a fist of the model figure; compressing a spring located in the fist; and triggering a contact which sends a signal that activates an audio device to provide an audio advertisement through a speaker in the model figure.

In some methods, the model figure comprises: a body comprising an arm; a glide connected to a distal end of the arm; and a post connected to the guide and comprising the contact, wherein the post extends from the guide and away from the arm; wherein the spring surrounds the post and the contact, a length of the spring in an uncompressed state is longer that a total length of the post and the contact; and wherein the fist comprises a keyhole configured to slide over the glide.

Some methods include the steps of providing an app downloadable to a smart device; downloading the app to the smart phone; communicating with the audio device via the app loaded on the smart phone; downloading additional audio clips to the audio device through the app; and updating an advertising message in the memory of the audio device. Some methods include the step of collecting user information and demographics through the app.

Some methods also include the steps of providing a coupon to a user through the app; and announcing the new coupon in an audio clip downloaded to the audio device and played on the speaker of the model figure. Some methods also include the steps of using the app to access a counter in the audio device, wherein the counter is configured to track a number of times m advertisement was played on the speaker of the model figure; uploading the data comprising at least the number of times the advertisement was played; and the step of sending the data via the app to a third-party server.

Now with reference to FIGS. 1-5, a figurine 100 is illustrated, according to various embodiments of the present invention. Some examples of the figurine 100 include, but are not limited to: a doll, a statuette, an action figure, a bobble head, a model figure, and a toy. In some configurations, the figurine 100 can be a representation of a real person (living or dead), a fictional character, an animated character, a comic book character, a theme park character or a team mascot.

In one example, the figurine 100 is fashioned to represent a sports figure, such as, a baseball player, a football player, a hockey player, a basketball player, or a race car driver. In such an example the sports figure can be a caricature of a current or former player of a particular team.

The figurine 100 comprises a head 126, a torso 134, legs 132 and feet 136. The figurine 100 can also comprise a pedestal 124. The pedestal 124 can be of any shape and size, which keeps the figurine 100 in an upright position. A weight might be included in the pedestal 124. In Some embodiments, the figurine 100 does not have a pedestal 124. In these embodiments, any inner workings, such as, for example an audio device can be located in the torso 134, the legs 132, or head 126 of the figurine 100, in such embodiments, weight may be added to the legs 132 and/or feet 136 to add stability to the figurine 100.

In some embodiments, the head 126 can be a caricature of a person (living or dead). The head 126 can be larger than what would be anatomically correct, as compared to the torso 134. The head 126 can be configured as a bobble-head. The head 126 can include headgear, such as, for example, a baseball cap, a helmet, or a head band.

The figurine 100 comprises an enlarged hand 120 (also referred to herein as "fist 120") on an arm assembly 122 and an opposite arm 130 with an opposite band 128. The enlarged hand 120 is at least three times larger than the opposite hand 128. The enlarged hand 120 is significantly larger than the opposite hand 128. The term "significantly larger", as used herein, means the size of the enlarged hand 120 is too big to be anatomically correct, as compared to the opposite hand 128, by a normal user. In some configurations, the enlarged hand 120 is at least four times larger than the opposite hand 128. In some configurations, the enlarged hand 120 is at least five times larger than the opposite hand 128. The enlarged hand 120, can be a hand, a glove, and/or a fist. Depending on the figurine 100, the enlarged hand 120 can be a claw, a paw, a hoof, bionic, armored, spiked, and/or any other such configuration, as required by the figurine 100 being constructed.

In some embodiments, the enlarged hand 120 is a fist, as illustrated in FIGS. 1-5. In some configurations, the fist 120 is at least four times larger than the opposite hand 128. In some configurations, the fist 120 is at least five times larger than the opposite hand 128. The fist 120 is significantly larger than opposite hand 128.

The opposite arm 130 has similar dimensions or equivalent dimensions to the visual portion of the arm assembly 122. The term "similar dimensions", as used herein, means the dimensions of the opposite arm 130 and the visual portion of the arm assembly 122 look about the same to a normal user.

In some configurations, the opposite hand 128 can be holding a prop. In some configurations, the opposite hand 128 can be wearing a prop. A prop can be anything from a piece of sporting equipment to a magic wand. For example, the prop can be a ball. Examples of a ball include, but are not limited to, a baseball, a soccer ball, a football, a basketball, and tennis ball. The prop can be a helmet. Other examples of props include, but are not limited to, baseball glove, batting glove, batting helmet, a bat and catcher equipment. Other examples of props include, but are not limited to, a hockey stick, hockey glove, a puck, a hockey helmet, and goalie equipment. Other examples of props include, but are not limited to, a weapon, a racket, a skateboard, or any other item, which fits with the theme of a particular figurine 100.

Figure 4:
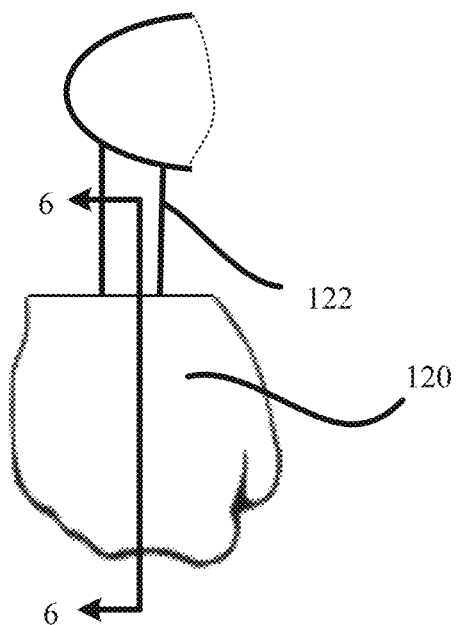
FIG. 4 is a top view of an arm assembly of the figurine with a fist in a normal position, in accordance with various embodiments.
Figure 5:
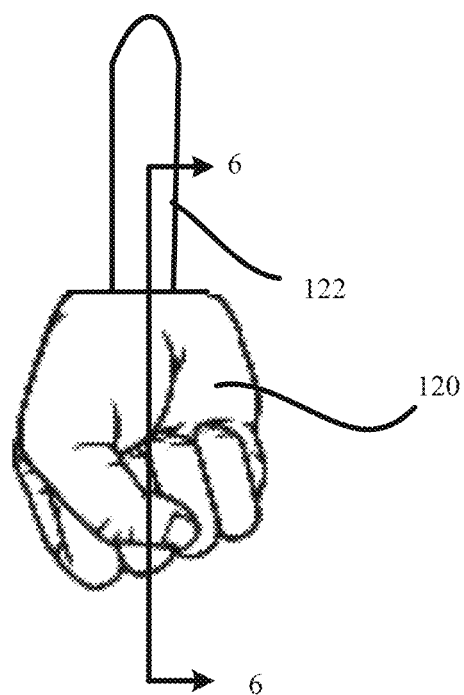
FIG. 5 is a bottom view of fire arm assembly of the figurine with a fist in a normal position, in accordance with various embodiments.
Figure 6:
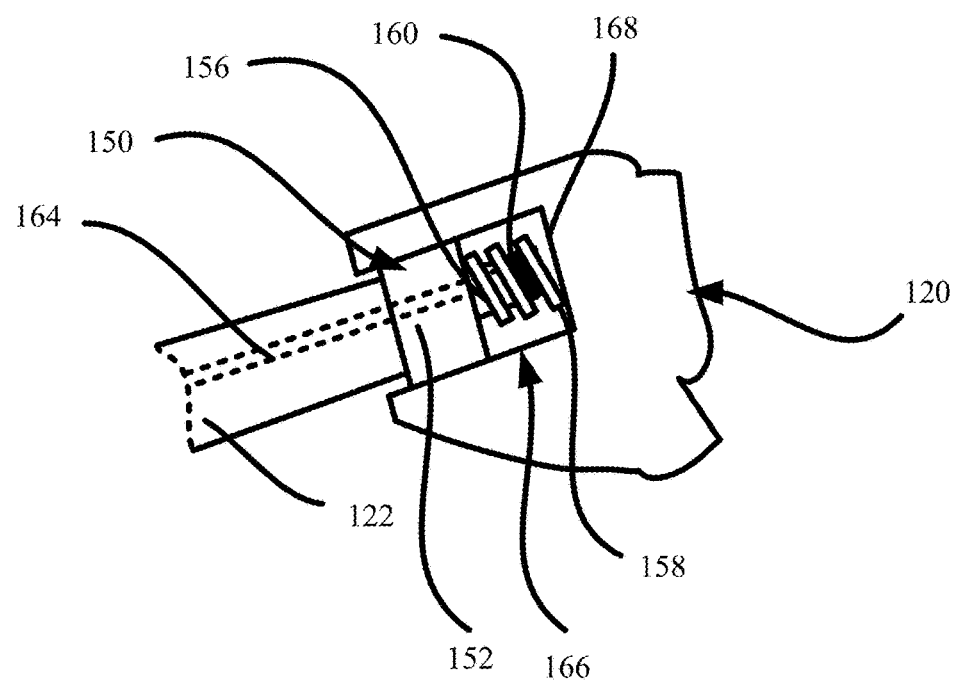
FIG. 6 is a cross-sectional view of the arm assembly with a fist in a normal position, as illustrated in FIG. 4 and FIG. 5, in accordance with various embodiments.

FIG. 6 is a cross-sectional view of FIGS. 4 and 5, which illustrates the mechanics inside of the arm assembly 122. The arm assembly 122 comprises a glide 150, which is located in the area of a wrist on the arm assembly 122. The glide 150 comprises annular ring 152, wind has a diameter greater than a diameter of the arm assembly 122. In some configurations, the diameter of the annular ring 152 is one and a half times great than the diameter of the distal end of the arm assembly 122. In some configurations, the diameter of the annular ring 152 is at least two times great than the diameter of the distal end of the arm assembly 122. In some configurations, the surface area of a cross-section of the glide 150 is at least one and a half times the surface area of a cross-section of the distal end of the arm assembly 122. The surface area of a cross-section of the glide 150 can be two times the surface area of a cross-section of the distal end of the arm assembly 122. The surface area calculation can be used for a glide that is cylindrical. In addition, the surface area calculation can be used for glides 150 of different shapes, which do not have a diameter.

A post 156 projects from a midpoint at the end of the glide 150. The post 156 has a diameter less than the diameter of the glide 150. In some configurations, the post 156 has a diameter that is equal to the arm assembly 122. At the distal end of the post 156 is a contact 160, which is connected to wire pair 164.

A spring 158 surrounds the peas 156. One end of the spring 158 is attached to the inner wall 168 of the fist 120. The other end of the spring 158 is attached to the end of the glide 150. The spring 158, when uncompressed, has a length which is greater than a length of the post 156 and the contact 160. In some configurations, the other end of the spring 158 is connected to the post 156. The spring 158, when uncompressed, creates a gap between the contact 160 and the inner call 168 of the fist 120.

As illustrated in FIGS. 2-6, theist 120 is in a normal position. In other words, in these FIGS, the fist 120 is in a read position or a standby position. In these FIGS, the fist 120 does not trigger the contact 160, however, the fist 120 is positioned if enough force is applied to the fist 120, then the fist 120 triggers the contact 160.

Figure 7:
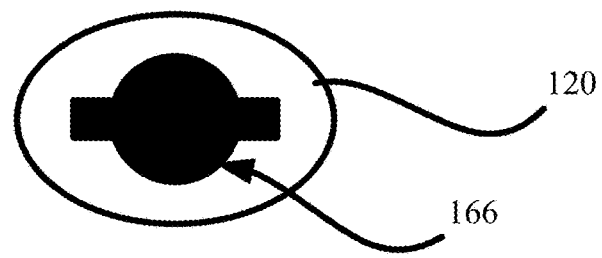
FIG. 7 is a rear view of the fist, in accordance with various embodiments.

As illustrated in FIG. 7, a keyhole 166 is bored into a back of the fist 120. The keyhole 166 is configured to slide over glide 150. A length of the keyhole 166 is at least long enough to cover the glide 150 when the spring 158 is in an uncompressed state.

Figure 8:
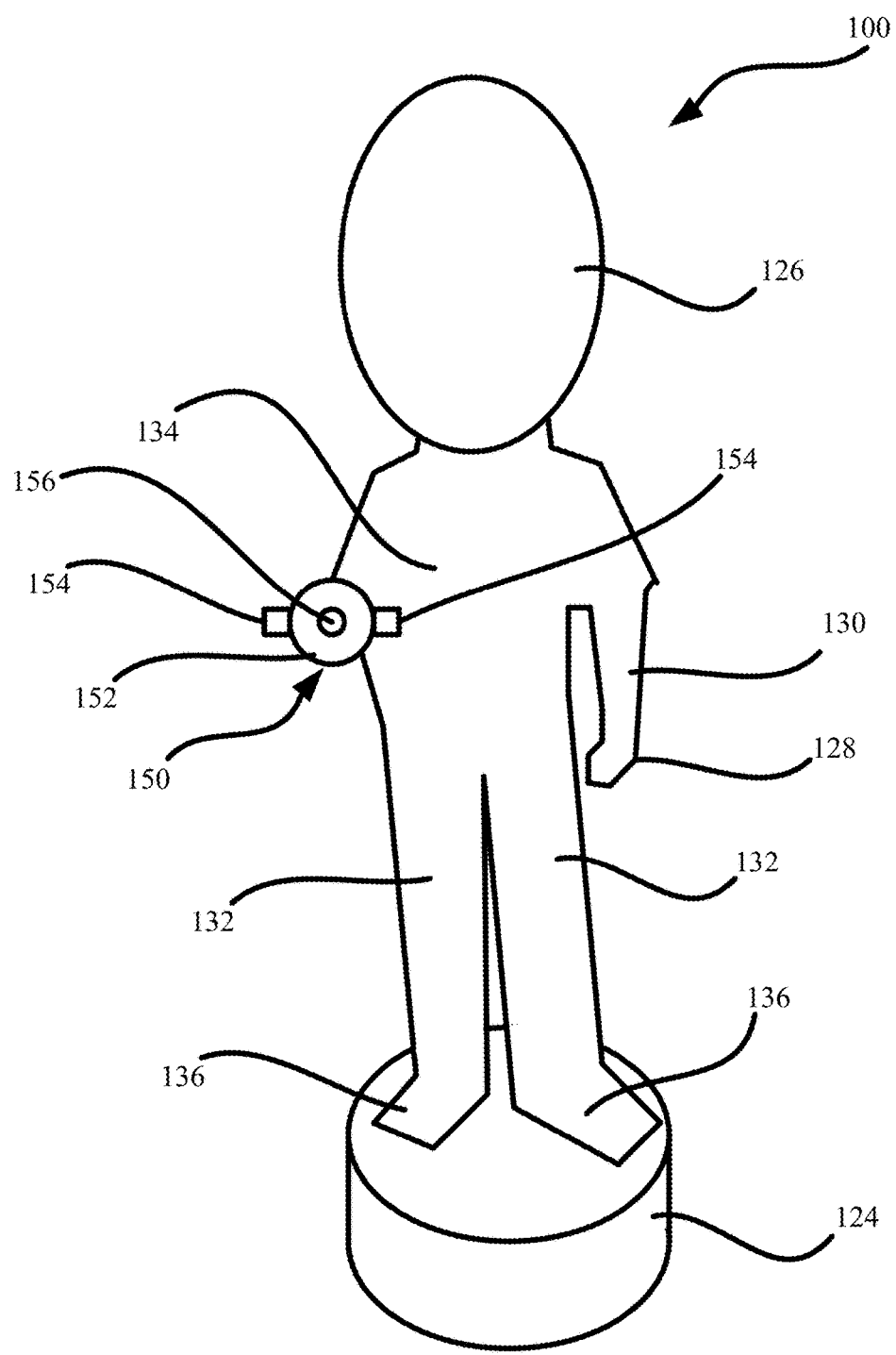
FIG. 8 is a front view of a glide in accordance with various embodiments.
Figure 9:
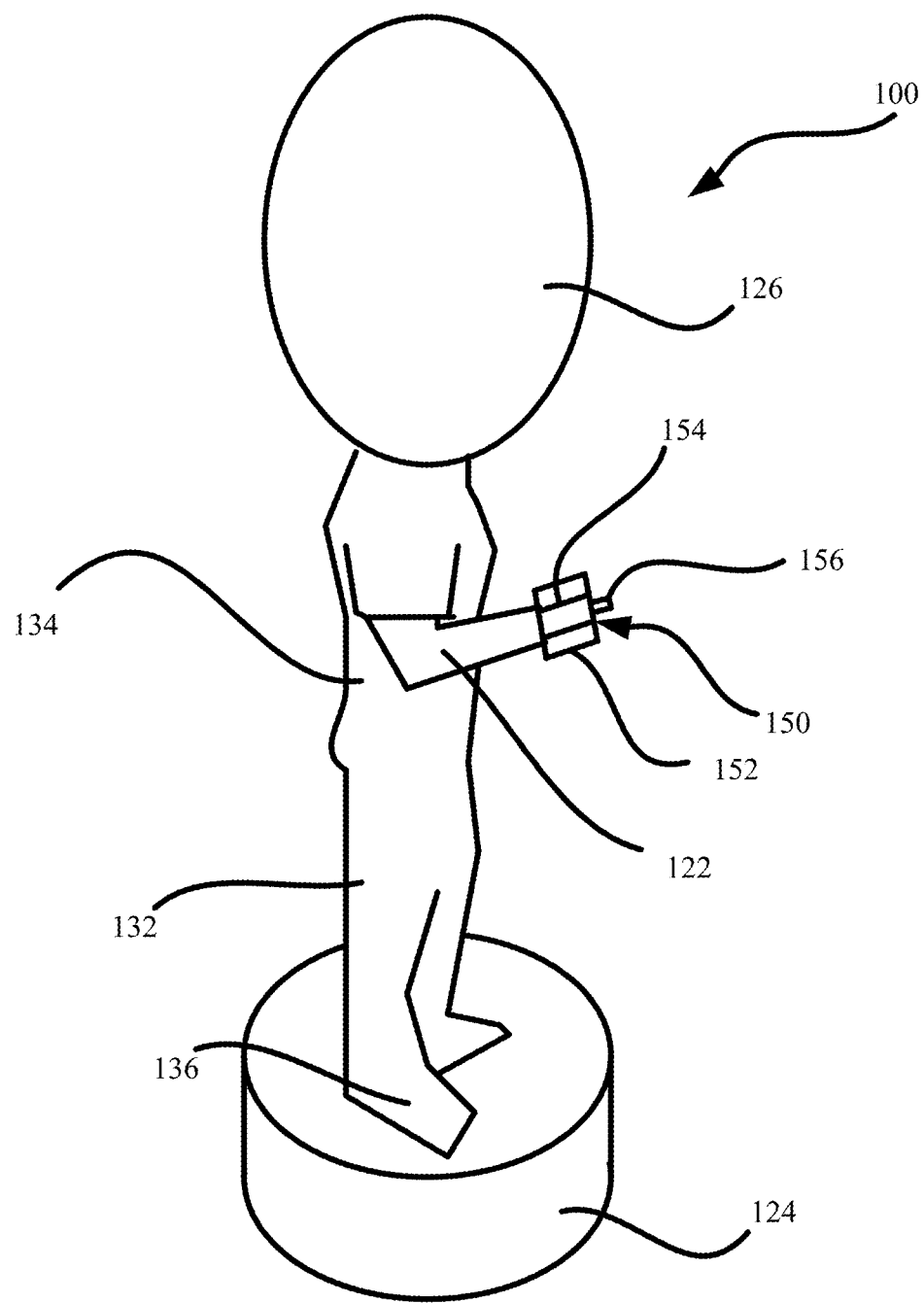
FIG. 9 is a side view from the left side of the glide, as illustrated in FIG. 8, in accordance with various embodiments.
Figure 10:
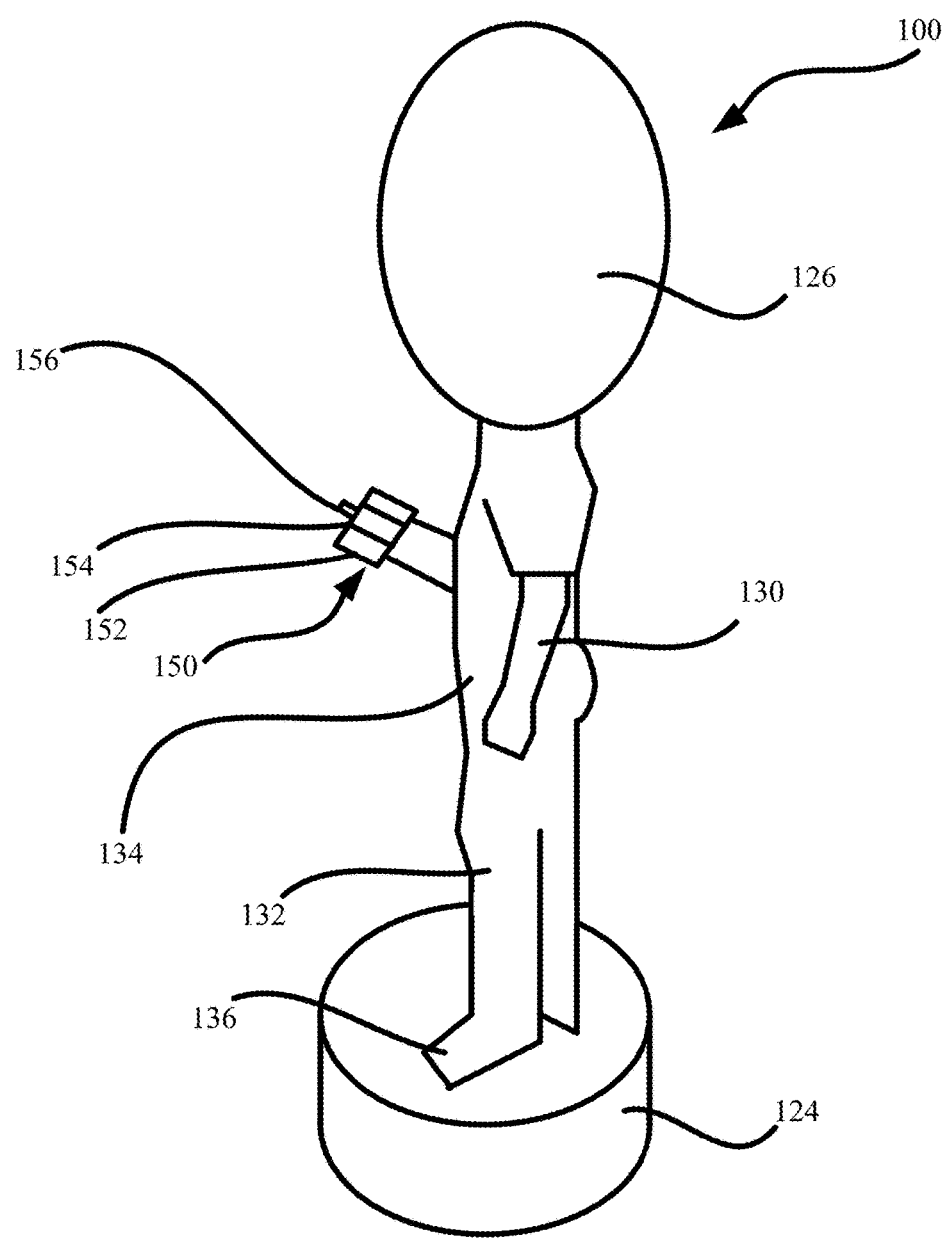
FIG. 10 is a side view from the right side of the glide, as illustrated in FIG. 8, in accordance with various embodiments.

Turning to FIGS. 8-10, the glide 150 is illustrated. The arm assembly 122 comprises the glide 150 and the post 156, as described herein. The glide 150 can comprise one or more stabilizers 154. The one or more stabilizers 154 prevent the fist 120 from rotating or pivoting around the glide 150. In the configuration, as illustrated, the glide 150 comprises two stabilizers 154 located on opposite sides of the glide 150. The glide 150 and the stabilizers 154 can be manufactured as one piece. An example of the keyhole 166, as illustrated in FIG. 7, is configured to slide over the example of the guide 150 and the two stabilizers 154, as illustrated in FIGS. 8-10.

Figure 11:
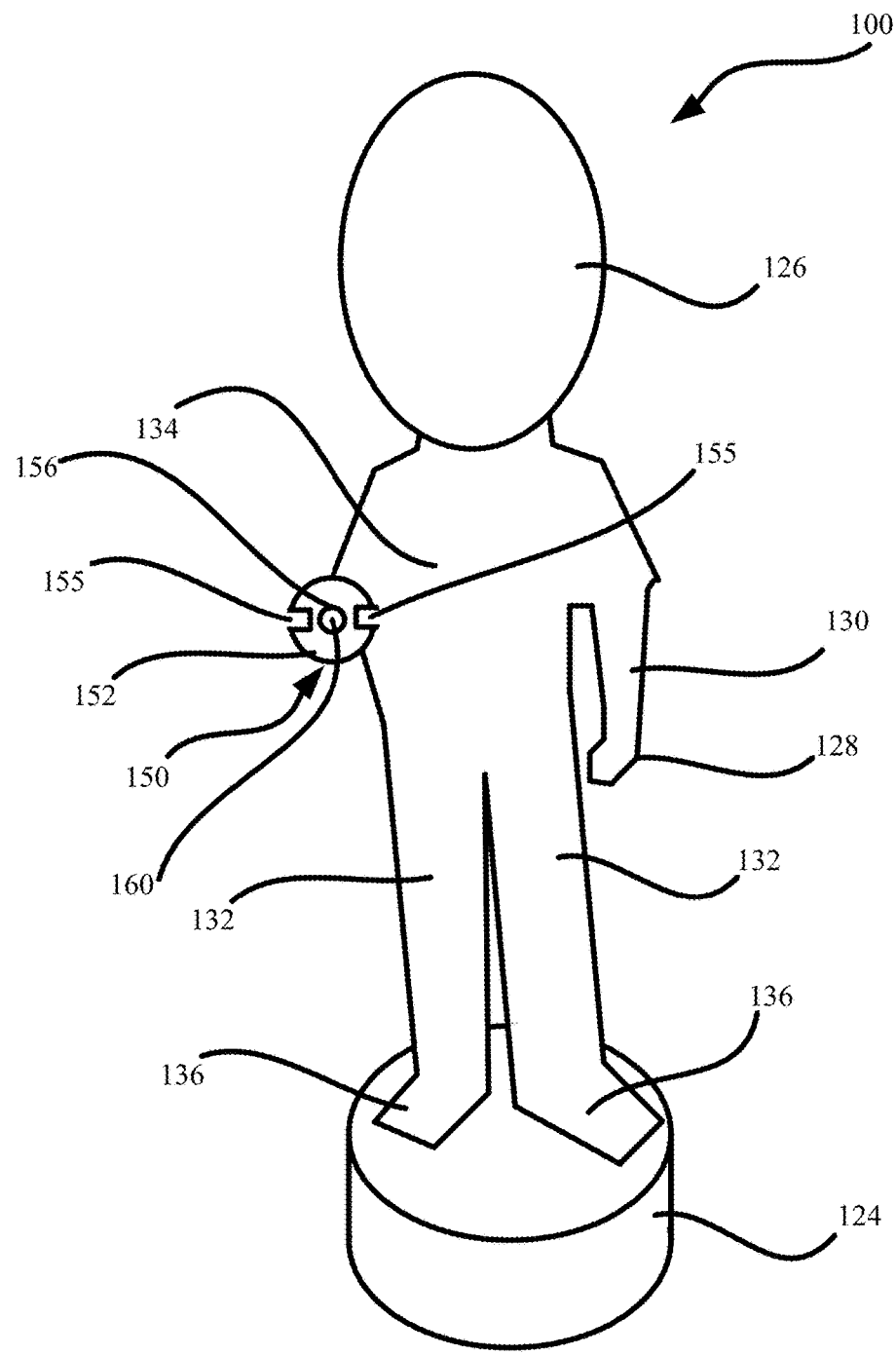
FIG. 11 is a front view of an example of an alternative glide, in accordance with various embodiments.
Figure 12:
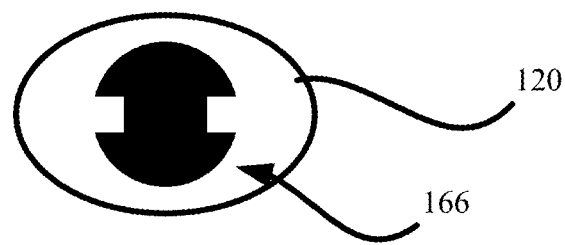
FIG. 12 is a rear view of an example of an alternative fist, in accordance with various embodiments.

In FIG. 11, an example of an alternative glide 150 is illustrated. The arm assembly 122 comprises the glide 150 and the post 156, as described herein. The glide 150 can comprise one or more grooves 155. The one or more grooves 155 prevent the fist 120 from rotating or pivoting around the glide 150. In the configuration, as illustrated, the glide 150 comprises two grooves 155 located on opposite sides of the glide 150. In FIG. 12, a rear view of an example of an alternative fist 120 is illustrated. The example of the keyhole 166, as illustrated in FIG. 12, is configured to slide over the example of the guide 150 and the two grooves 155, as illustrated in FIG. 11.

Of course, any combination of grooves 155 and stabilizers 154 can be incorporated into the glide 150. In one example, the glide 150 comprises at least one groove 155 and at least one stabilizer 154. For example, the glide 150 can comprise two stabilizers 154 on opposite sides of the glide 150 and two grooves 155 on opposites of the glide 150 and orthogonal to the two stabilizers 154. In this example, the keyhole 166 is configured to fit over the two stabilizers 154 and to fit into the two grooves 155, which allows the fist 120 to slide over the glide 150 without rotating around the glide 150.

In some configurations, the arm assembly 122 can be parallel to the pedestal 124. In other configurations, the arm assembly 122 can be at an angle, wherein the distal end of the arm assembly is elevated in relation to the elbow of the arm assembly 122. For example, the arm assembly 122 can be at an angle of ten degrees. However, the am assembly 122 can be at an angle of twenty degrees. The range of the angle of the arm assembly 122 is from 0 degrees to 30 degrees. Larger angles can be used, however, the keyhole 166 of the hand 120 may have be adjusted so that the hand 120 slides on the glide 150. Of course, the keyhole 166 can be configured to position the band 120 at any angle in relation to the arm assembly 122, as desired by a designer and/or a fabricator.

Figure 13:
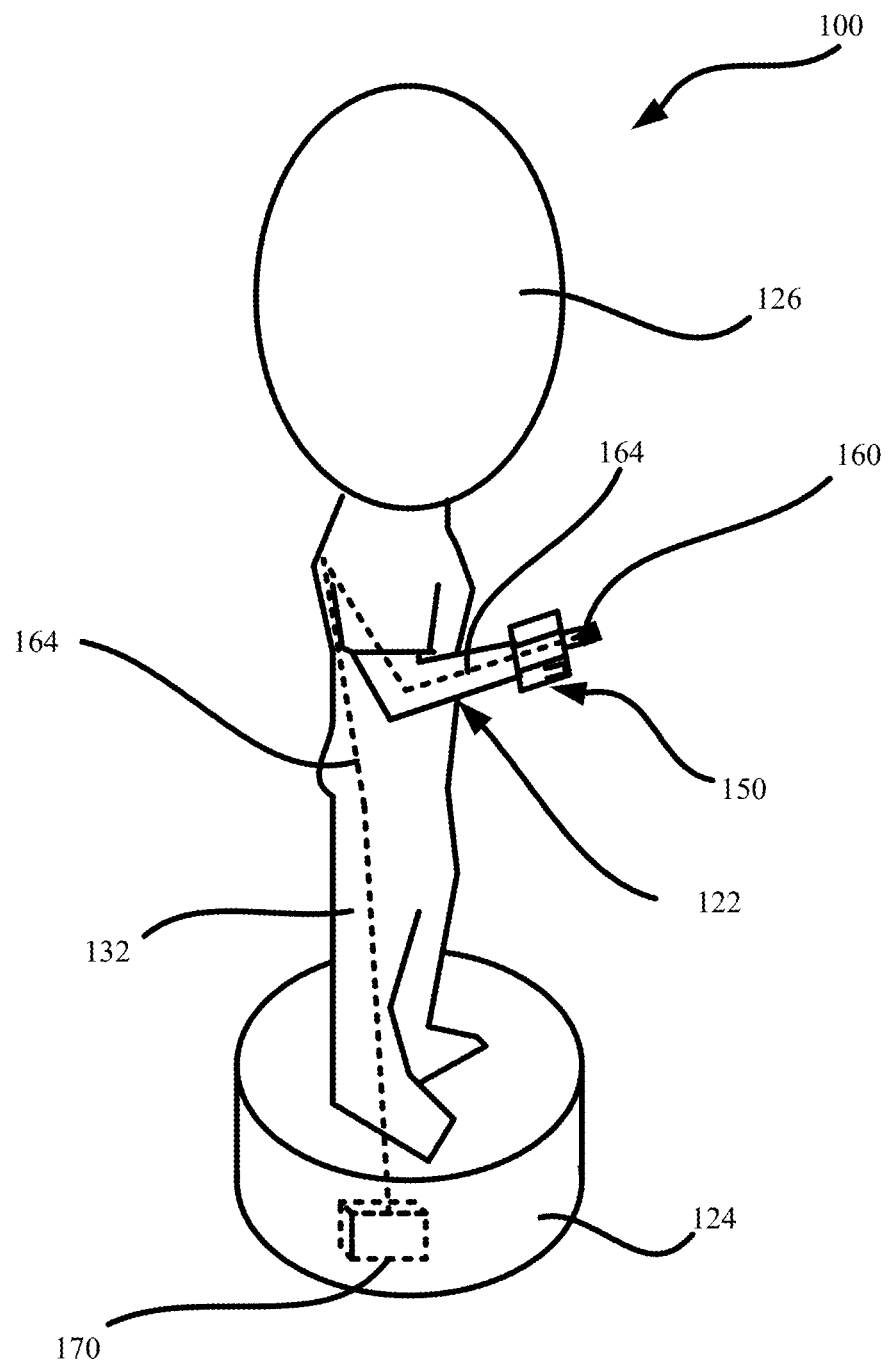
FIG. 13 is a side view from the left side of the figurine illustrating an example of a wiring diagram, in accordance with various embodiments.

Turning to FIG. 13, an example of a wiring diagram for the figurine 100 is illustrated. The contact 160 is connected to wire pair 164, which is communication with an audio device 170. When the contact 160 is engaged, a signal is sent to the audio device 170, which activates the audio device 170. In some configurations, the contact 160 is in wireless communication with the audio device 170. In some configurations, the contact 160 and audio device 170 are integrated into one unit, which is located in the glide 150.

Figure 14:
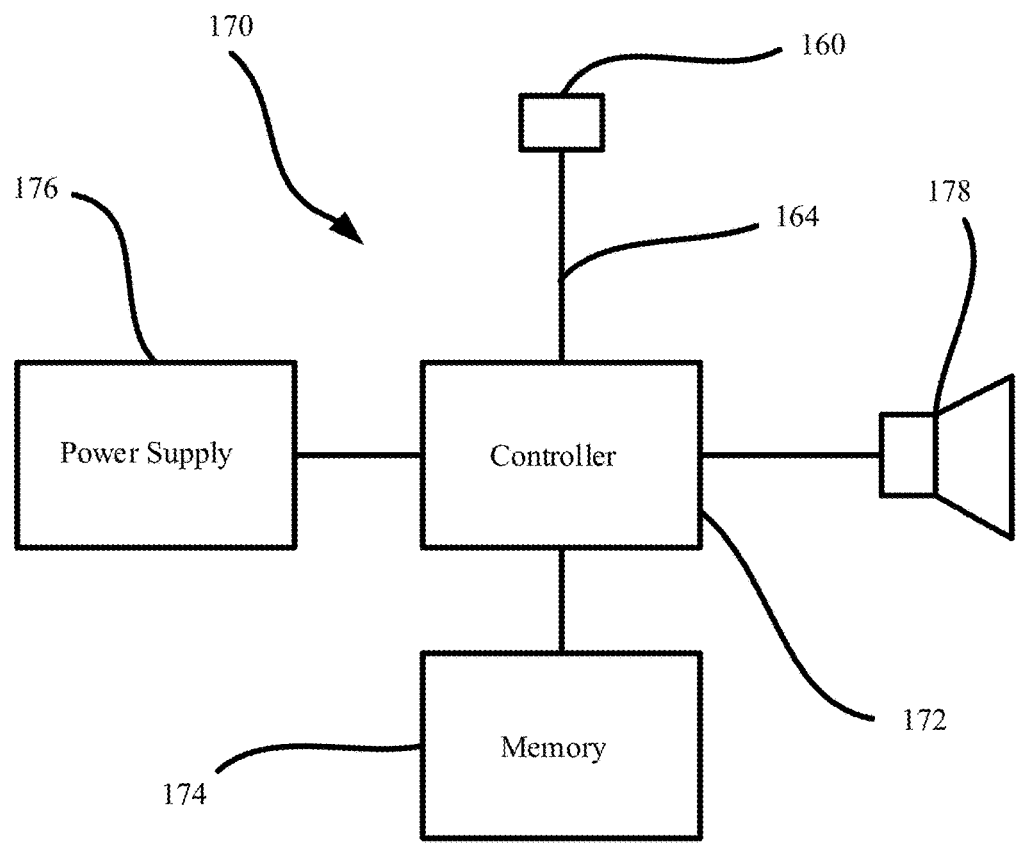
FIG. 14 is a block diagram illustrating an exemplary audio device, in accordance with various embodiments.
Figure 15:
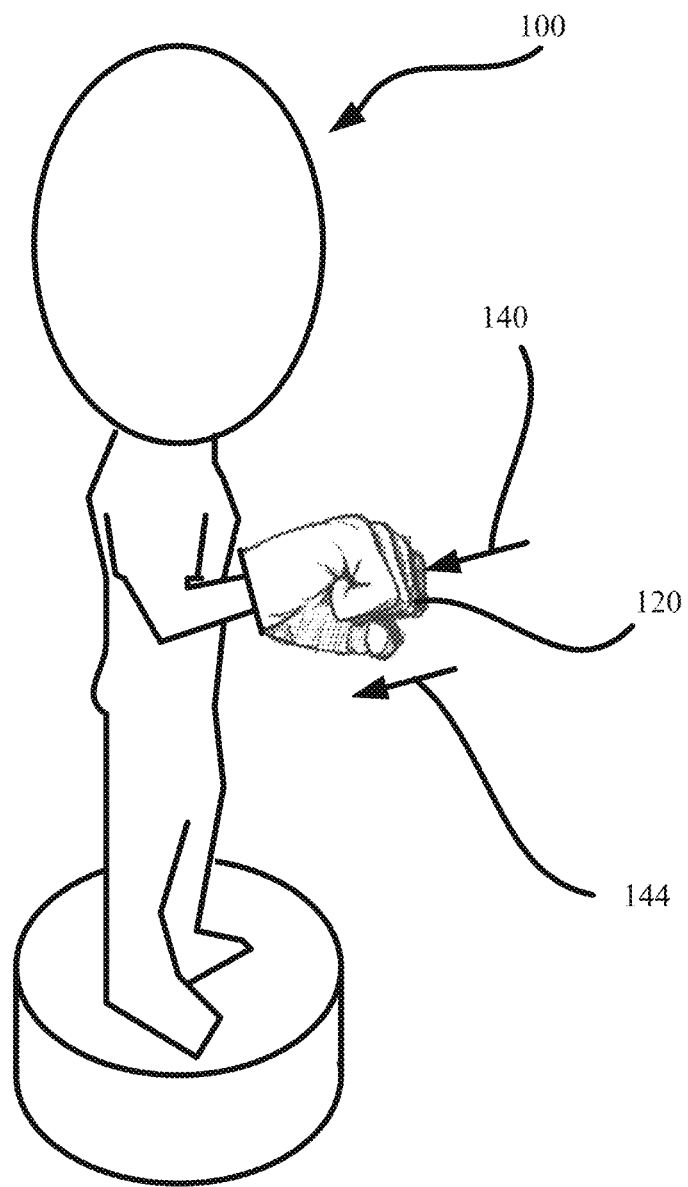
FIG. 15 is a side view from the left side of the figurine with the fist in an engaged position, in accordance with various embodiments.
Figure 16:
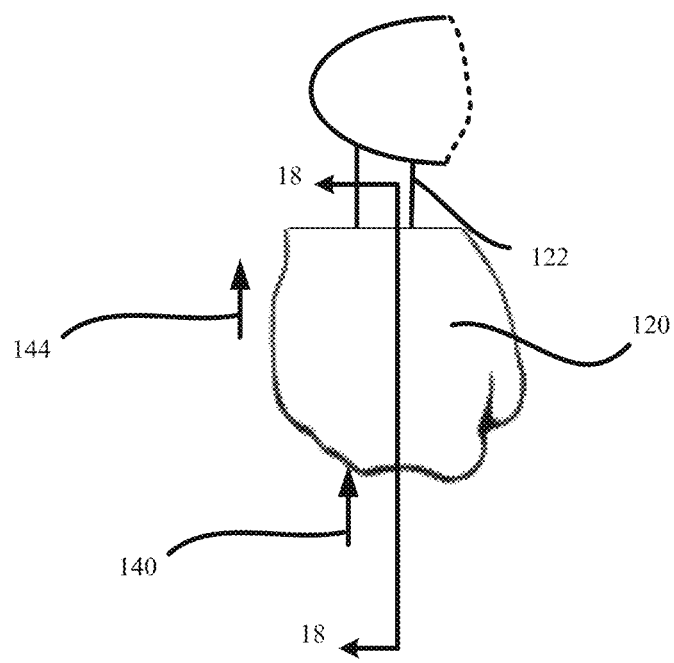
FIG. 16 is a top view of an arm assembly of the figurine with a fist in the engaged position, in accordance with various embodiments.
Figure 17:
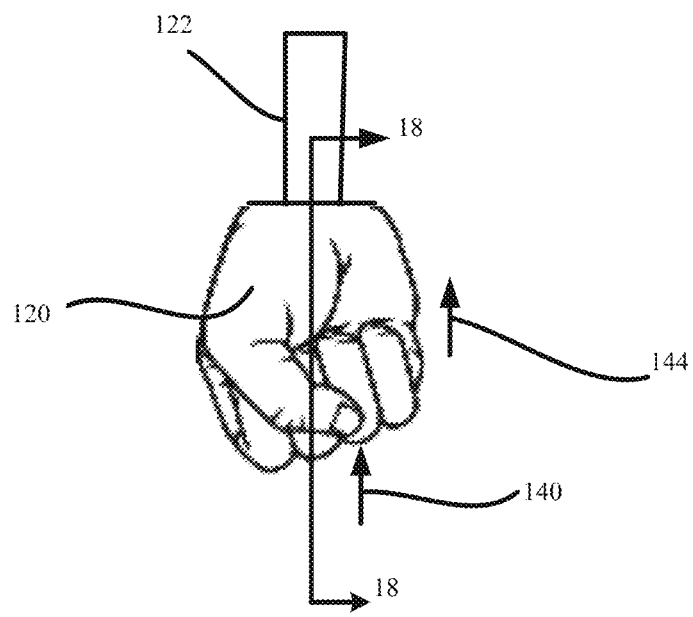
FIG. 17 is a bottom view of the arm assembly of the figurine with a fist in the engaged position, in accordance with various embodiments.
Figure 18:
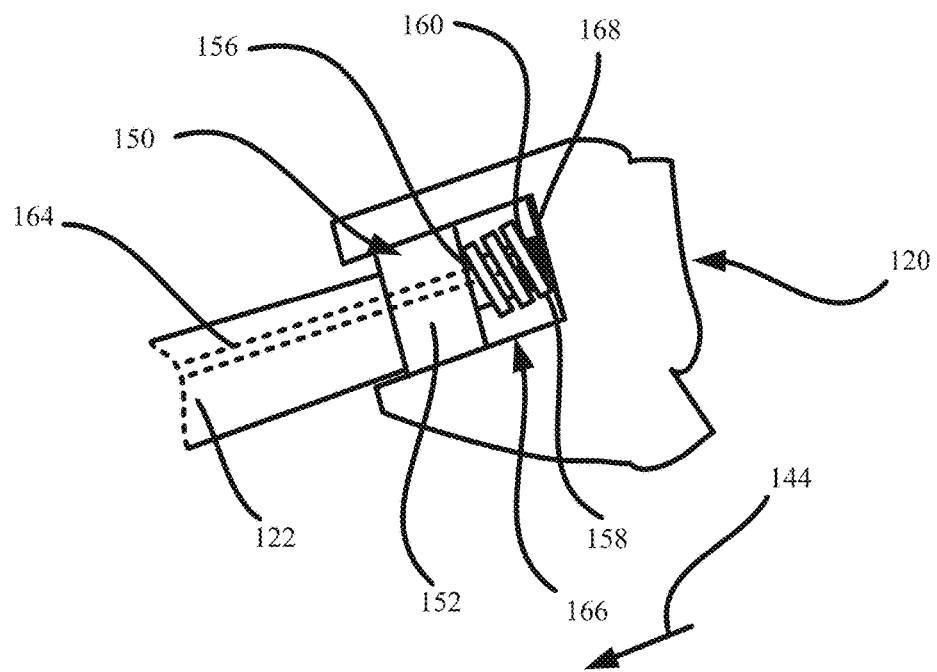
FIG. 18 is a cross-sectional view of the arm assembly with a fist in the engaged position, as illustrated in FIG. 16 and FIG. 17, in accordance with various embodiments.
Figure 19:
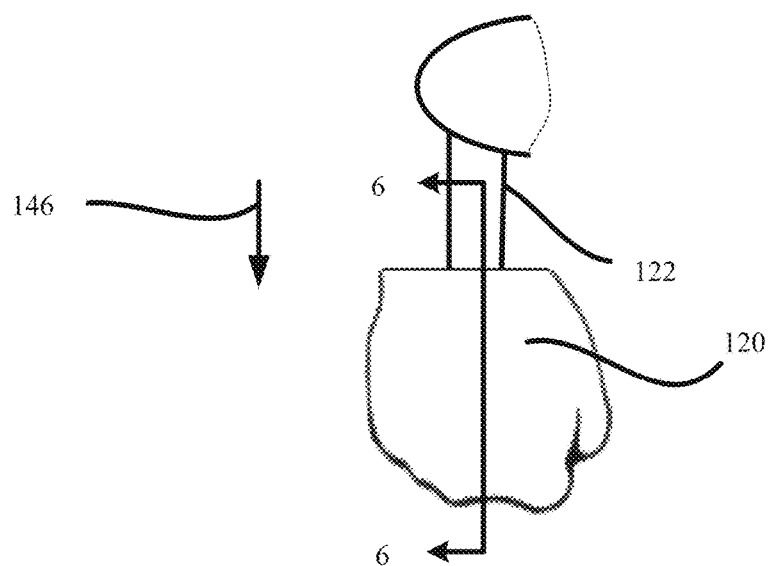
FIG. 19 is a top view of an arm assembly of the figurine with a fist in the normal position, in accordance with various embodiments.

Moving to FIG. 14, exemplary components of the audio device 170 are illustrated in a block diagram. The audio device 170 can comprise a controller 172, a power supply 176, a memory 174, and a speaker 178. The contact 160 is in communication with the controller 172 via the wire pair 164. The memory 174 holds one or more audio dips. The controller 172 can play the audio clips in order or randomly. For example, the audio clips can the voice of the person represented by the figurine 100. The power supply 176 provides power to the controller 172, which can transfer power to any of the other components in the audio device 170. The power supply 176 is typically self-contained within the figurine 100. A battery is an acceptable power supply 176 for most applications of the figurine 100.

Upon a triggering of the contact 160 by a user, a signal is sent to the controller 172 via the wire pair 164. The signal activates the controller 172 to access an audio clip from the memory 174 and play the audio dip through the speaker 178. In some embodiments, the power supply 176, the memory 174, the controller 172, and the speaker 178 are a single unit. Examples of an audio device 170, which can be used in the figurine 100, are known to those skilled in the art. Various audio systems used in the greeting card industry can be implemented in the figurine 100 as the audio device 170. Certain audio systems used in the toy industry can be implemented in the figurine 100 as the audio device 170.

Typically, the speaker 178 is located in the pedestal 124. In some configurations, the speaker 178 is located in the torso 134 of the figurine 100. In certain configurations, the speaker 178 is located in a mouth of the figurine 100.

In some embodiments, the audio device 170 has a communication port, which can be either wireless or wireable. The communication port can be used for volume control, download of additional audio clips, and/or diagnostics. For example, the communication port can connect a smart phone or other smart device to the audio device 170 via Blue Tooth. In such a configuration, the smart device can download additional audio clips from a website of a sponsor or a licensee of a particular figurine 100. The additional audio clips can then be download from the smart device to the audio device 170 via Blue Tooth. A button can be located on the bottom of the pedestal 124, which is in communication with the audio device 170 and is configured to turn on/off the Blue Tooth, which conserves the battery life of the power supply 176. A volume control, which is in communication with the audio device 170 can be located on the pedestal 124. In some configurations, the communication port can be used to recharge the batteries of the power supply 176.

Some embodiments provide a figurine 100 comprises a body, a head 126 connected to the body, a pedestal 124 connected to the body, an audio device 170 inside of the pedestal 124, an arm 122 connected to the body, a glide 150 connected to a distal end of the arm 122, and a post 156 connected to the guide 150 and extended away from the arm 122. The figurine 100 further comprises a contact 160 on a distal end of the post 156, wherein the contact 160 is in communication with the audio device 170. The figurine 100 further comprises a spring 158 surrounding the post 156 and the contact 160 wherein a length of the spring 158 in an uncompressed state is longer that a total length of the post 156 and the contact 160. The figurine 100 further comprises an oversized hand 120 comprising a keyhole 166 in a back of the hand 120, wherein the keyhole 166 is configured to slide over the glide 150.

The spring 158 surrounding the post 156 is configured to prevent an inner wall 168 of the keyhole 166 from triggering the contact 160 when the hand 120 is in a normal position. The body can comprise a pair of legs 132 each of which is connected to a foot 136 and a torso 134. The audio device 170 can comprise a controller 172, a power supply 176, a memory 174, and a speaker 178. The contact 160 is in communication with the controller 172 via the wire pair 164.

Moving to FIGS. 15-19, the mechanical operation of the arm assembly 122 is illustrated. As a point of reference, the fist 120 starts in a normal position (a ready position or a standby position), as illustrated in FIGS. 2-6. A force 140 (as indicated by the arrow) is applied to the front surface of the fist 120. The amount of force 140 has to be enough to compress the spring 158. The force 140 moves the fist 120 towards the torso 134, which is travel 144 (as indicated by the arrow). The fist 120 is in an engaged position in FIGS. 15-19. In other words, in these FIGS. 15-19, the fist is in a trigger position or an activation position. In these FIGS, the fist 120 triggers the contact 160. The travel 144 is the distance the fist 120 moves from the normal position to the engaged position. The travel 144 can be 1 mm. However, to imitate a fist pump, the travel 144 is at least 5 mm. The travel 144 is in a range from 1 mm to 10 mm. After the force 140 is removed from the fist 120, the fist 120 has a release 146 (as indicated by the arrow), in which the spring 158 moves the fist 120 back to the normal position.

The spring 158 is a lightweight spring. The spring 158 can be a compression spring. The spring 158 can be a coil spring. The spring 158 is easily compressible over the distance of the travel 144. For example, when applying Hook's Law ($F=kX$, where F=force, k=stiffness, and X=distance) to the spring 158, the k value is very low. In addition, the spring 158 has be compressed enough to move the fist 120 from the normal position to the engaged position without knocking over the figurine 100.

Figure 20:
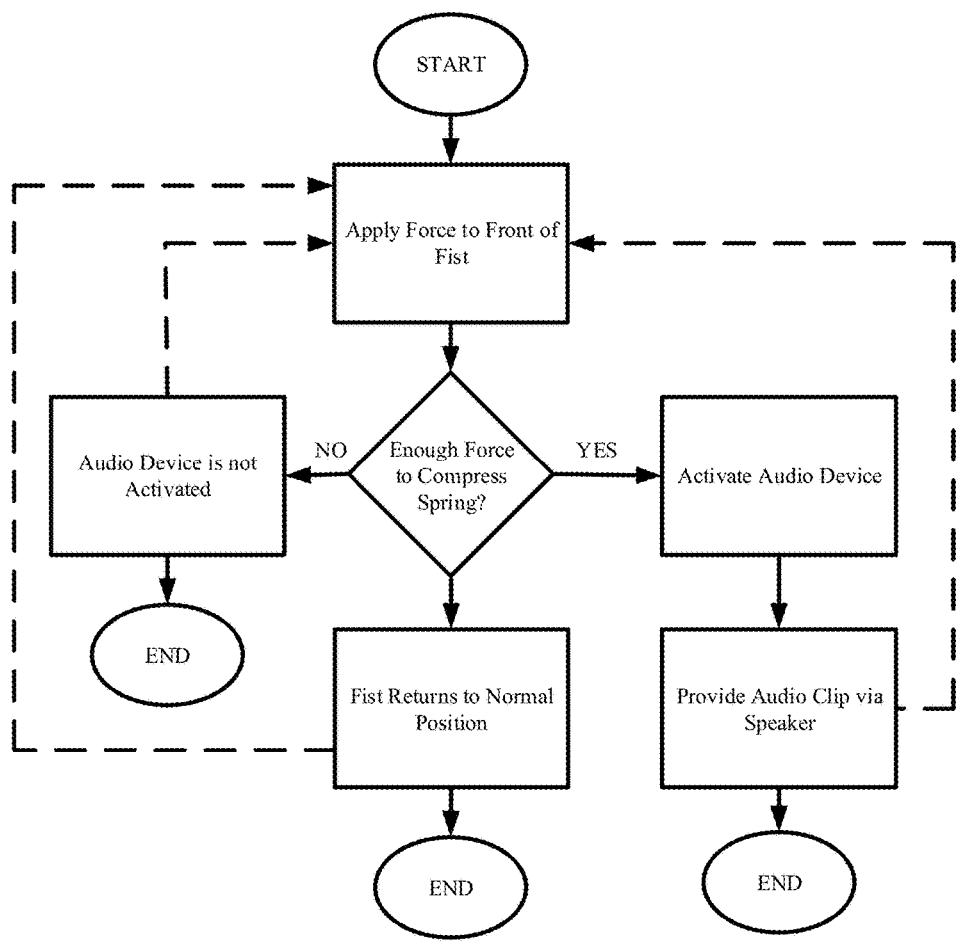
FIG. 20 is a flow chart illustrating an example of a method of use of the figurine, in accordance with various embodiments.

FIG. 20 is a flowchart, which illustrates an example of a method of use of figurine 100, according to various embodiments of the present invention. A method of use of a figurine 100, as described herein, can include some or all of the steps described below. The user applies a force 140 on the front, surface of the fist 120. Did the user apply enough force to compress the spring 158 in the figurine 100?

If no, then the audio device 170 in the figurine 100 is not activated. In the next step, the user ends the method or the user can go back to the step of the user applies a force 140 on the front surface of the fist 120.

If yes, the contact 160 sends a signal to the audio device 170, which activates the controller 172, which provides an audio clip stored on the memory 174 to the user through the speaker 176. In the next step, the user ends the method or the user can go back to the step of the user applies a force 140 on the front surface of the fist 120.

Whether the answer is either yes or no, the spring 158 decompresses and the fist 120 goes back to the normal position. In the next step, the user ends the method or the user can go back to the step of the user applies a force 140 on the front surface of the fist 120.

A method of providing a sound clip from a model figure 100 can comprise the steps of providing the model figure 100 comprising an arm assembly 122; a glide 150 on the end of the arm assembly 122, wherein a surface area of a cross-section of the glide 150 is at least twice a surface area of the arm assembly 122, the glide 150 further comprises a contact 160 in communication with an audio device 170 on a post 156; an enlarged hand 120 comprising a keyhole 166 in the rear of the enlarged hand 120 and configured to slide on the glide 150, wherein the enlarged hand 120 is at least four times bigger proportionally as compared to a size of a hand that normally fits on the arm assembly 122; and a spring 158 surrounding the post 156 and preventing an inner wall 168 of the keyhole 166 from triggering the contact 160.

The method can further include the steps of applying a force 140 to a front surface of the enlarged hand 120; con pressing the spring 158, triggering the contact 160, wherein the contact 160 sends a signal to an audio device 170, wherein the signal activates the audio device 170 to provide an audio clip through a speaker 176 in the figurine 100.

In some configurations of the figurine 100, the enlarged hand 120 is a fist. A method of providing an audio clip from a fist bump to the figurine 100. The method can comprise the step of applying a force 140 to a surface of the fist 120 of the figurine 100, compressing the spring 158, triggering the contact 160 to send a signal to an audio device 170, wherein the signal activates the audio device 170 to provide an audio clip through a speaker 176 in be figurine 100.

A method of delivering advertising can include the steps of providing the figurine 100; applying a force 140 to a front surface of the fist 120; compressing the spring 158, triggering the contact 160, wherein the contact 160 sends a signal, which activates an audio device 170, and providing an audio advertisement through a speaker 176 in the figurine 100. The audio advertisement can be mixed in a group of audio clips stored in the memory 174. In one example, five audio clips are stored in the memory 174, of which four audio clips are the voice of the character of the figurine 100 and one audio clip is the advertisement. The audio device 170 can be programmed to play the five audio clips in an order, and the audio advertisement can be the second audio clip played through the speaker 176. Of course, the audio advertisement can be positioned as any one of the audio clips, for example first, or for example last. In some configurations, the audio clips stored on the audio device 170 are played in a random order. In one of these configurations, the audio advertisement is programmed to be non-random and is given an actual position in the order of play of the audio clips. For example, the audio device 170 can be programmed so that the audio advertisement is always played the second audio clip. The audio device 170 can be programmed so that the audio advertisement is always played in a certain frequency, for example every fourth audio clip. Of course, any number of audio clips can be stored in the memory 174. In addition, multiple audio advertisements can be stored in the memory 174. The audio advertisement can from the organization selling or giving away the figurine 100. The audio advertisement can from a sponsor that has facilitate the giveaway of the figurine 100 at an event, such as, for example, a sporting event. The audio advertisement can be a giggle or a series of musical notes, and/or speech that is the voice of the character of the figurine 100 and/or can be the voice of another diameter or spokesperson.

In configurations of the figurine 100, which include Bluetooth or some other wireless communication device, an app can be downloaded on a smartphone, which can provide new audio clips to the figurine 100 via wireless communication with the smartphone. Using the app, an organization and/or a sponsor can update the message provided by the audio clips on the figurine 100. For example, a baseball team is giving away a number of the figurines 100 at a certain game. In this example, the sponsor (advertising partner) provided funds to cover costs of the figurines 100 in exchange for advertising, which can include one or more audio clips stored in the memory of the figurine 100. Also in this example, the figurine 100 is fashioned to represent a star player on the team and audio advertisement can use the star player's voice. After the season is over, the learn can offer an app, which adds new audio clips that message next season and can include one or more updated audio advertisement, in some aspects, the app can also delete certain audio clips, which can include the audio advertisement, if desired. In this example, the audio clips can include new player voice clips and/or audio clips from highlights of the past season, for example, a game winning homerun.

The app can collect user information and demographic data, which can be used by the organization and/or the sponsor. Incentive, such as, for example, an audio coupon or a digital coupon, could be offer to drive the app downloads and increase the data collected. In the example above, the sponsor could offer a coupon or incentive code m the post season or after the season, to drive an updated app download, which provides more data, some of which is updated by the user. In the example above, the team could offer a ticket package or discounts on team merchandise, which is only available to users who download an update of the app that is made available after the end of the season. Of course, the sponsor and/or the team could take advantage of the holiday season for messaging and/or sales, by offering discounts or other incentives via an update of the app for the holiday season. Any other configurations of the use of audio advertisement are within the scope of the invention disclosed herein. Some embodiments provide methods of fist pump advertising.

In some configurations, the app can access a counter on the audio device 170 that counts the number of times the audio advertisement was played on the figurine 100. This data from the counter can be used to provide a better number of the impact of the advertising. If new audio advertisements are downloaded to the memory 174, the counter can be reset and the data collected corresponds to the new audio advertisement.

Figure 21:
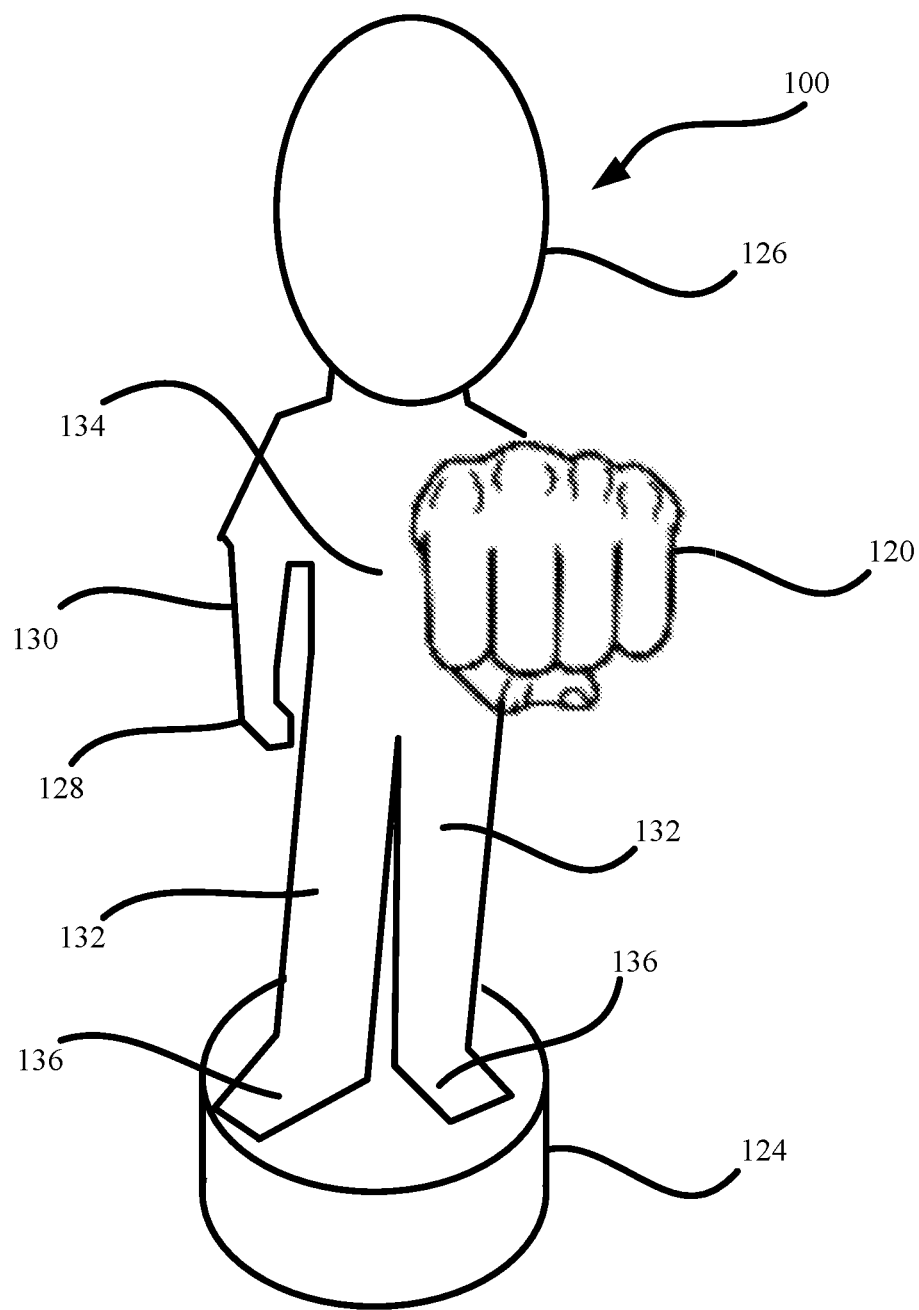
FIG. 21 is a front view of the figurine with a fist on the left arm, in accordance with various embodiments.

FIGS. 21-29 illustrate various non-limiting examples of alternative configurations of the figurine 100. As illustrated in FIG. 21, the figurine 100 has the fist 120 on the left arm assembly 122. The operation of the figurine 100 with the fist 120 on the left arm assembly 122 is the same as the figurine 100 with the fist 120 on the right arm assembly 122, as discussed herein. Any configuration of the figurine 100 can have the enlarged hand 120 on either the right arm assembly 122 or the left arm assembly 122. In some configurations, the figurine 100 can have two enlarged hands 120 with one enlarged hand 120 on the right arm assembly 122 and the other enlarged hand 120 on the left arm assembly 122. In such configurations, the two enlarged hands 120 can be mirrored images of each other, or completely different from each other. As will be obvious to one skilled in the one skilled in the art, any configuration of one or more of the enlarged hand 120 in any orientation can be used on the figurine 100, all of which are within the invention disclosed herein.

Figure 22:
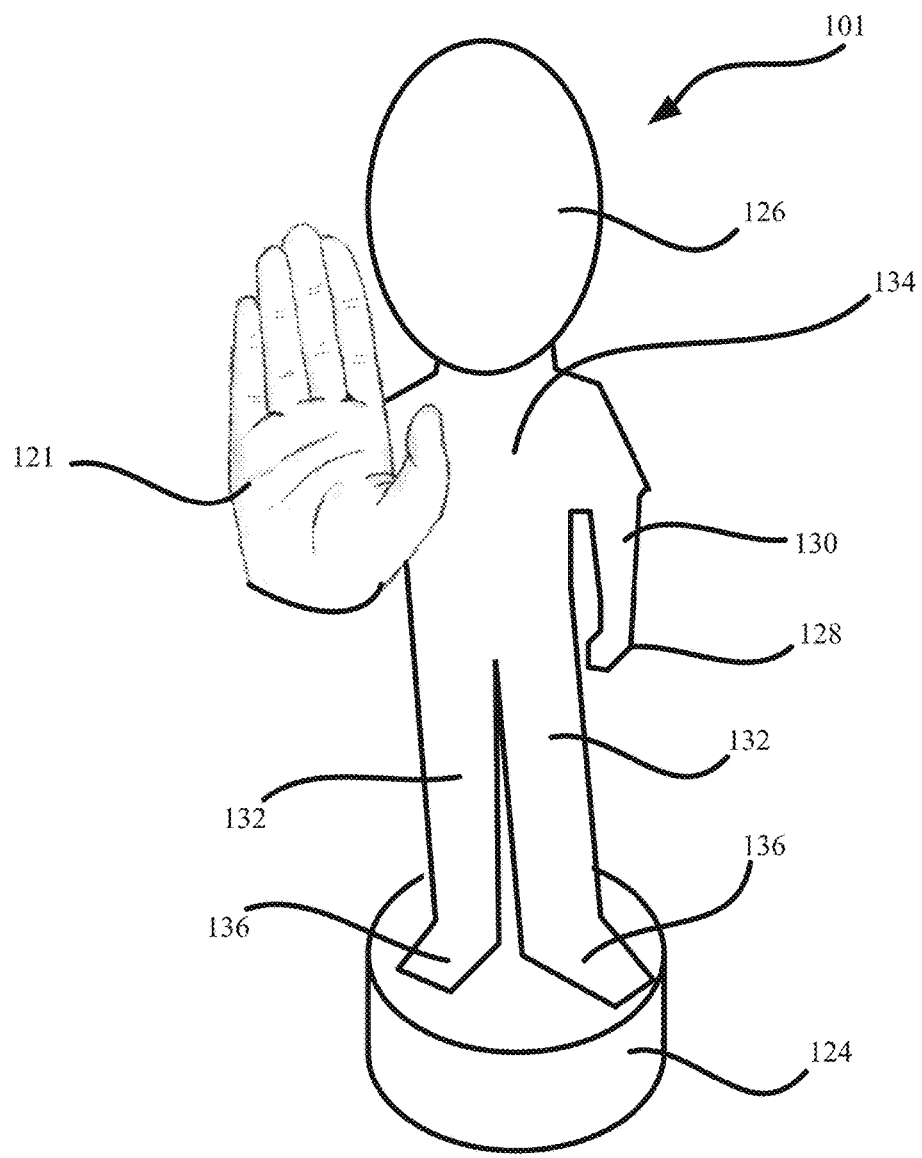
FIG. 22 is front view of a first example of an alternative configuration of the figurine, in accordance with various embodiments.
Figure 23:
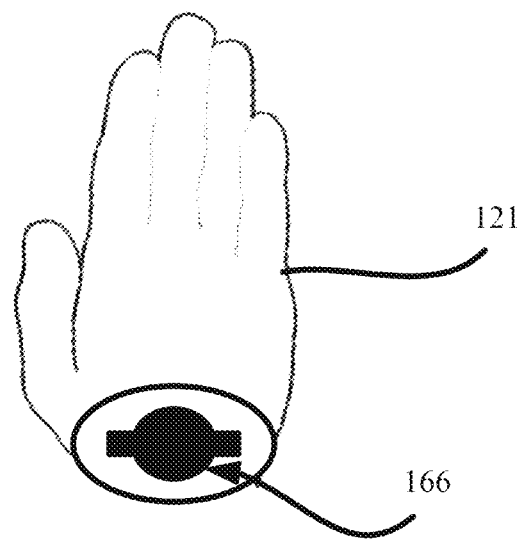
FIG. 23 is a rear view of the hand in the first example of the alternative configuration of the figurine of FIG. 22, in accordance with various embodiments.

Moving FIG. 22, a front view of a first example of an alternative configuration of the figurine 100 is illustrated. In this example, the enlarged hand is configured as an open hand 121. The operation of the open hand 121 is the same as the figurine 100 with the fist 120, as discussed herein. As illustrated in FIG. 23, a keyhole 166 goes into the back of the opened hand 121. The keyhole 166 is configured to fit onto glide 150, as discussed herein. The keyhole 166 can be of any configuration to match the configuration of the glide 150. The angle of the keyhole 166 into the opened hand 121 can be adjusted to provide the open hand 121 the proper orientation on the figurine 100, as desired by a designer and/or a fabricator. In this configuration, the opened hand 121 can positioned for a "high-five", which activates the audio device 170, as discussed herein.

Figure 25:
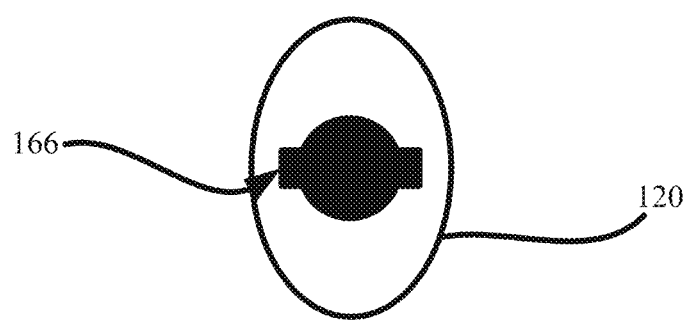
FIG. 25 is a rear view of the fist in the second example of the alternative configuration of the figurine of FIG. 24, in accordance with various embodiments.
Figure 24:
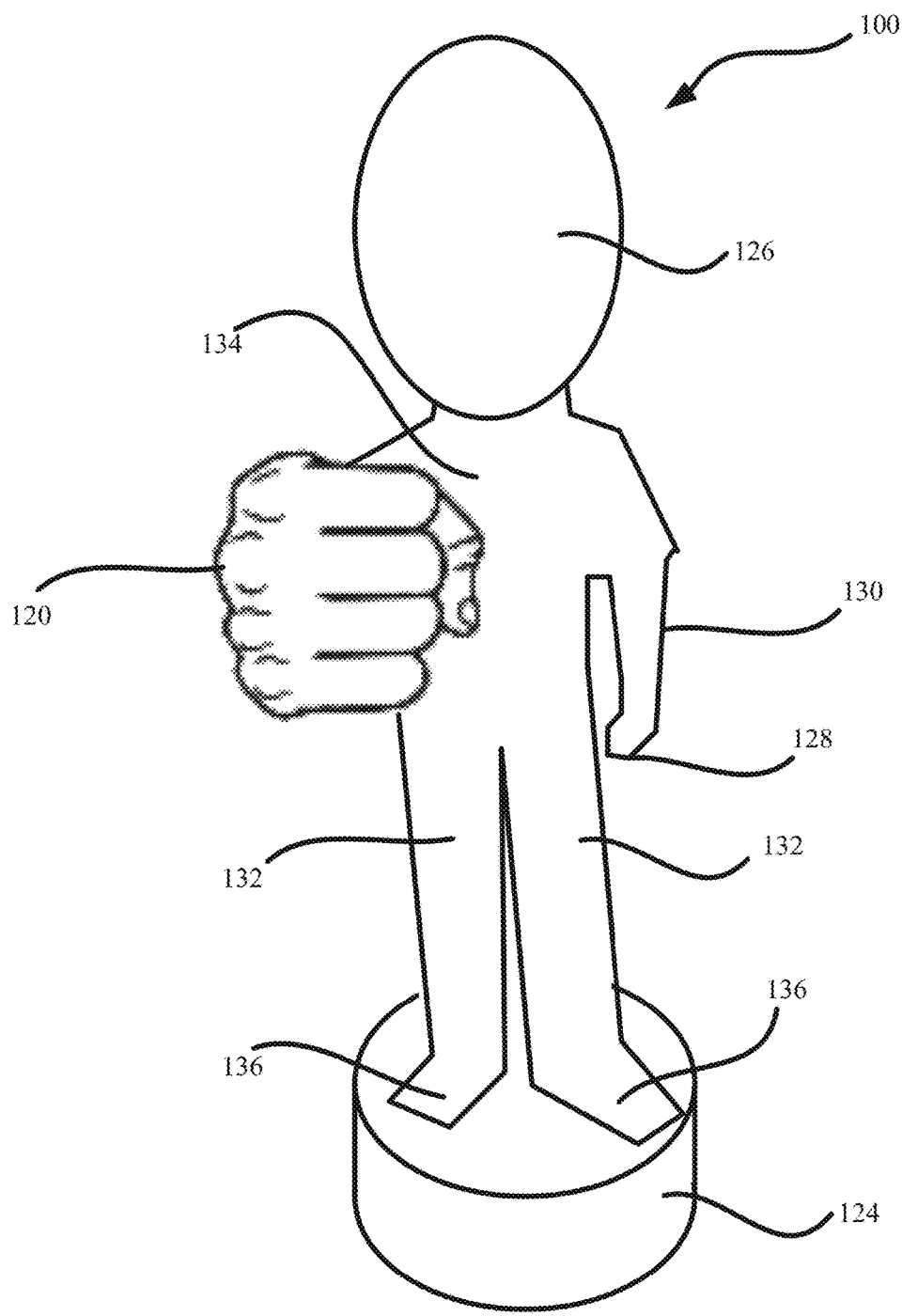
FIG. 24 is front view of a second example of an alternative configuration of the figurine, in accordance with various embodiments.

Turning to FIG. 24, a front view of a second example of an alternative configuration of the figurine 100 is illustrated. In this example, the fist 120 is orientated in an orthogonal position to that previously shown on Figurine 100, in for example, FIGS. 1-3. The operation of the fist 100 in the orthogonal position is the same as the figurine 100 with the fist 120, as discussed in for example FIGS. 1-6. As illustrated in FIG. 25, a keyhole 166 goes into the back of the opened hand 121. The keyhole 166 can be configured to position the fist 100 at any angle (as in rotated in a front one view and/or as in relation to the arm assembly 122), as desired by a designer and/or a fabricator.

Figure 26:
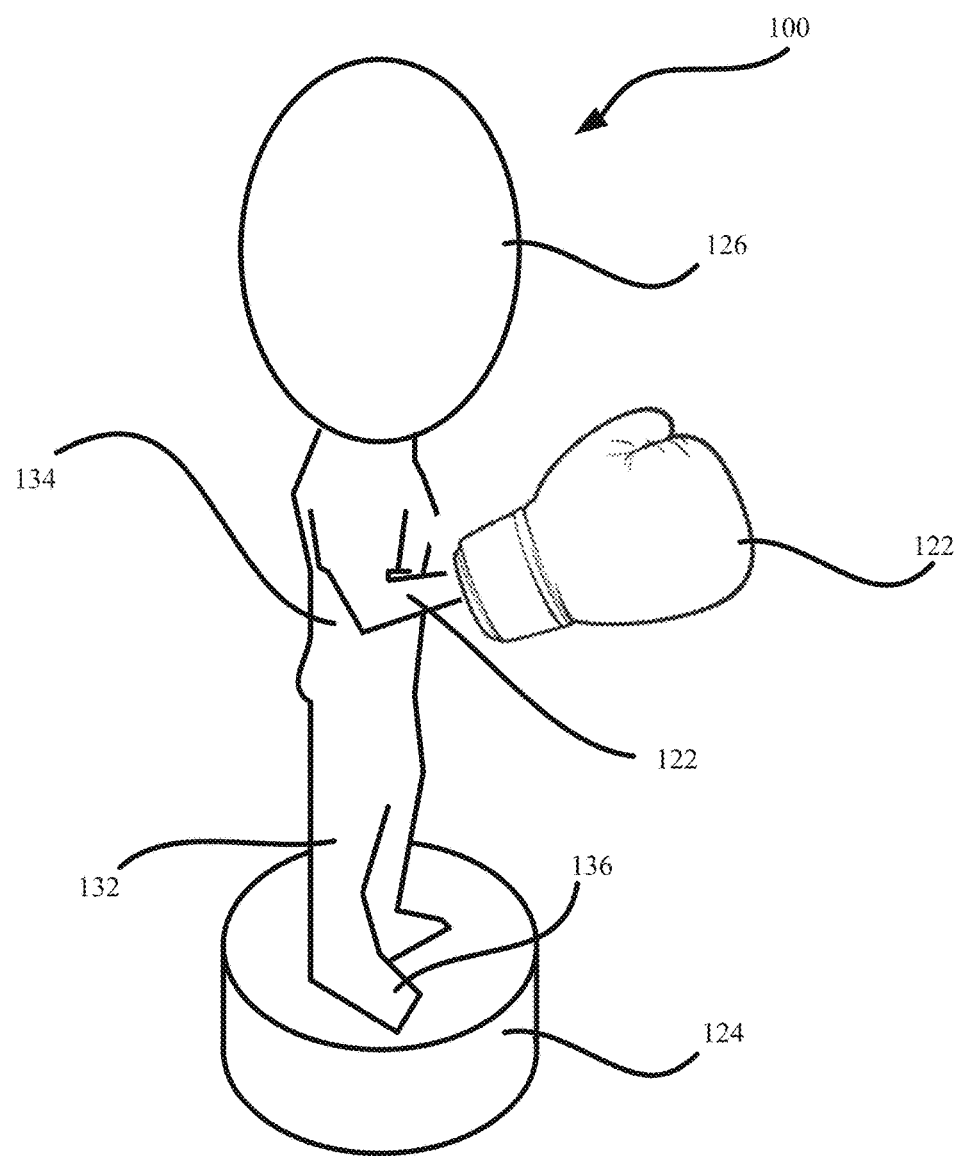
FIG. 26 is right side view of a third example of an alternative configuration of the figurine, in accordance with various embodiments.
Figure 27:
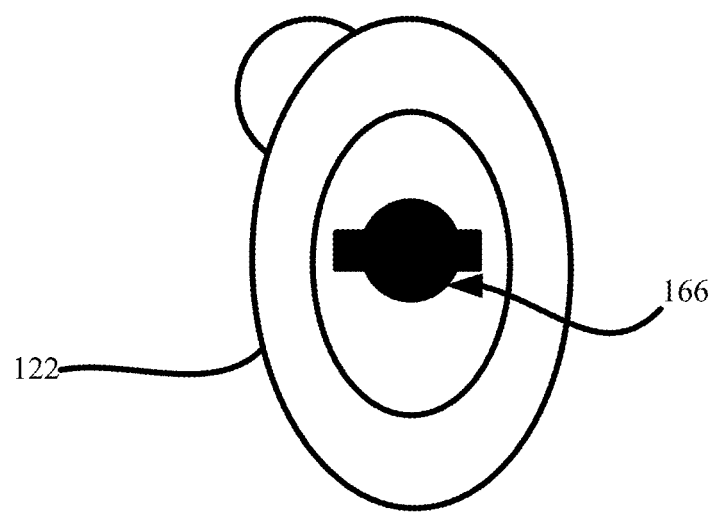
FIG. 27 is a rear view of the boxing glove in the third example of the alternative configuration of the figurine of FIG. 26, in accordance with various embodiments.

In FIG. 26, a right side view of a third example of an alternative configuration of the figurine 100 is illustrated. In this example, the enlarged hand is configured as, a boxing glove 122. The operation of the boxing glove 122 is the same as the figurine 100 with the fist 120, as discussed herein. As illustrated in FIG. 27, a keyhole 166 goes into the back of the boxing groove 122. The keyhole 166 is configured to fit onto glide 150, as discussed herein. The keyhole 166 can be of any configuration to match the configuration of the glide 150. The keyhole 166 can be configured to position, the boxing glove 122 at any angle (as in rotated in a front view and/or as in relation to the arm assembly 122), as desired by a designer and/or a fabricator. In an example, the figurine 100 can be fabricated to be a boxer, which has a pair of boxing gloves 122, with one boxing glove 122 on the right arm assembly 122 and the other boxing glove 122 on the left arm assembly 122.

Figure 29:
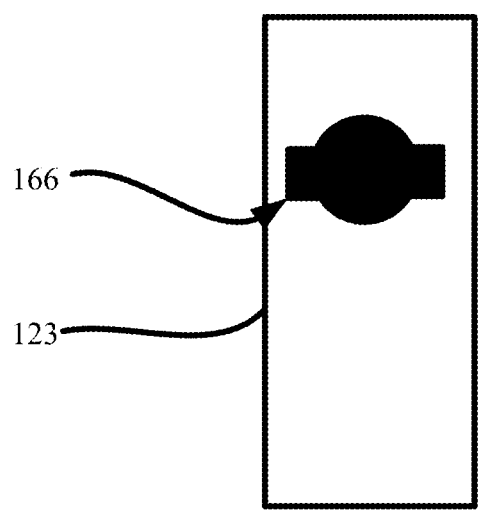
FIG. 29 is a rear view of the glove in the fourth example of the alternative configuration of the figurine of FIG. 28, in accordance with various embodiments.
Figure 28:
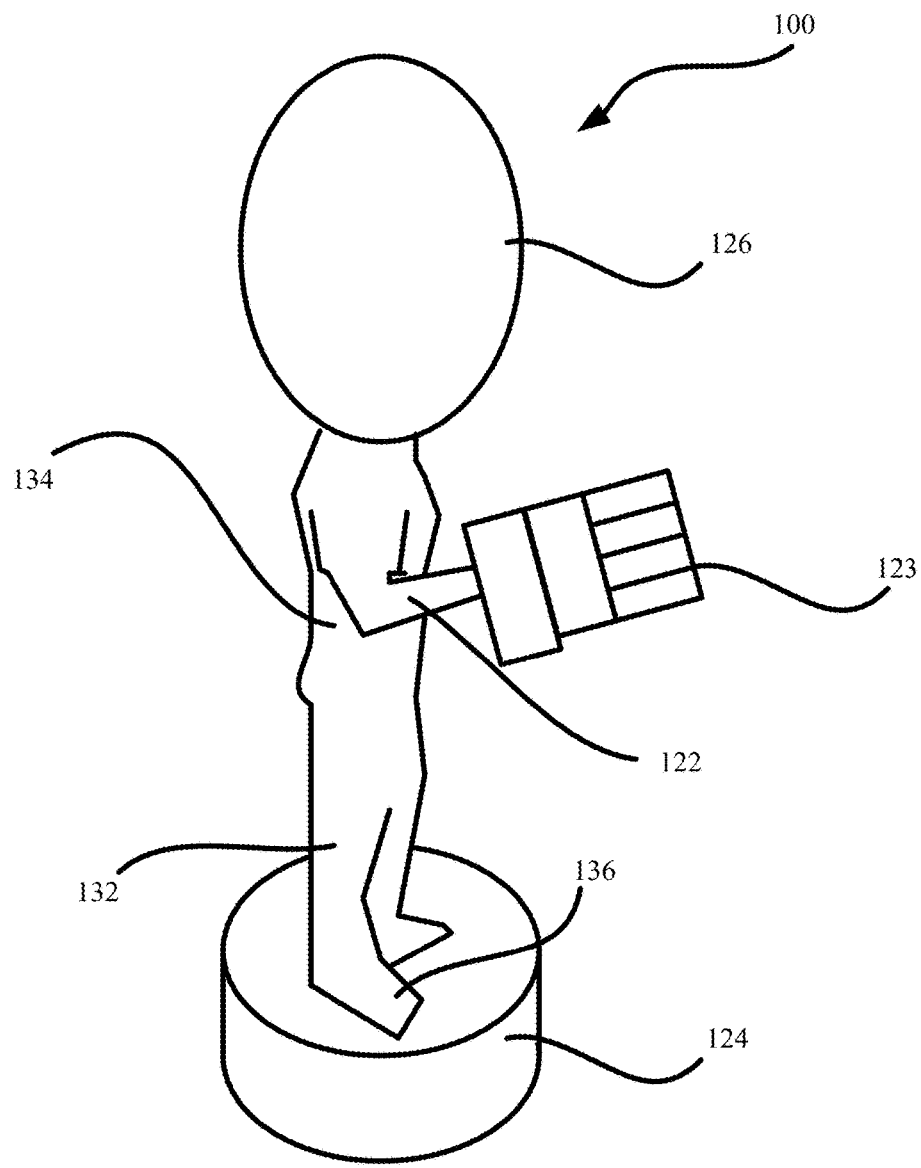
FIG. 28 is right side view of a fourth example of an alternative configuration of the figurine, in accordance with various embodiments.

Finally, in FIG. 28, a right side view of a fourth example of an alternative configuration of the figurine 100 is illustrated. In this example, the enlarged hand is configured as a glove 123. An example of the glove 123 can be a hockey glove. Another example of the glove 123 can be a baseball glove. Still another example of the glove 123 can be a mountain bike glove. The operation of the glove 123 is the same as the figurine 100 with the fist 120, as discussed herein. As illustrated in FIG. 29, a keyhole 166 goes into the back of the glove 123. The keyhole 166 is configured to fit onto glide 150, as discussed herein. The keyhole 166 can be of any configuration to match the configuration of the glide 150. The keyhole 166 can be configured to position the glove 123 at any angle (as in rotated in a front view and/or as in, relation to the arm assembly 122), as desired by a designer and/or a fabricator.

As illustrated in FIGS. 21-29 illustrate various non-limiting examples of alternative configurations of the figurine 100. However, there are countless other alternative configurations of the figurine 100, for example, a fictional character, an animated character, an action figure, a comic book character, a theme park character or a team mascot. For example, if the figurine 100 is a team mascot or a theme park character, the enlarged hand 120 can be a paw, a hoof, or a claw. The figurine 100 can be placed in any pose or in any position, for example, in an action pose, an arm flexing pose, a Heisman pose, a sitting position, a laying position, a fighting position, or a standing position. Any or all of these alternative configurations of the figurine 100 are within the scope of the invention disclosed herein.

Examples of alternative embodiments include using the mechanisms described herein for the foot 136 rather than the enlarged hand 120. For example, the figurine 100 can be configured to produce audio by moving the foot 136. As such, the foot 136 can be either a right foot, a left foot, or both feet. This is not limited to only human feet but can include a paw a foot, a claw, a peg leg, or any type of foot from a fictional character. The foot 136 can be clad in a shoe, such as, a cleat, a running shoe, flipper, or other types of foot gear. An object, such as, a ball, can be attached to the foot 136, and the audio response is activated by pushing the object. In a variation of this alternative embodiment, the foot 136 can be configured to a kicking motion to activate the audio response. The foot 136 can be configured with any or all objects whereupon either right or left foot or both feet are pushed to activate audio. For example, kicking an object whereupon the object hung kicked is pushed to activate audio, for example, kicking a soccer ball or a football. In another variation of this alternative embodiment, the toot 136 is in any pose or position whereupon moving the foot 136 a certain pose or position activates the audio.

Still further, the five (5) toes of the foot 136 can be configured to be pushed together at one time or one or more of each of the five (5) toes pushed separately to activate the audio. Similarly, the five (5) fingers of the enlarged hand 120 can be configured to be pushed together or any of the five (5) fingers pushed separately to activate the audio. In examples of this variation, the fingers can include, but are not limited to: an index finger for "Number 1", index finger & middle finger for "Peace Sign", "middle finger", "hand slap/high-five", and "thumbs up".

Variations of the enlarged hand 120 can include an object placed in the enlarged hand, which can be pushed to activate the audio. In an example of this variation, the enlarged hand can be holding a microphone, which is bumped to activate the audio. In some examples of this variation, the enlarged hand can be holding a ball which is humped to activate the audio. Examples of the ball, include, but are not limited to, a baseball, a basketball, a football, a volleyball, a soccer ball, a tennis ball, or a golf ball. In some examples of this variation, the enlarged hand can be holding an object which is bumped to activate the audio. Examples of the ball include, but are not limited to, a hockey stick, a helmet, a mask, a glove, a tennis racquet, a ping pang paddle, a golf club, a baseball bat, a sign, a gun, a book, a bouquet of flowers, a weapon, a light saber, and the like. In an example of this variation, the object can be on one or more of the lingers of the enlarged hand 120. For example, the object can be a championship ring, which is pushed to activate the audio.

An example of an alternative embodiment includes using the mechanisms described herein for a set of lips on the head 126, rather than the enlarged hand 120. For example, the figurine 100 can be configured to produce audio by moving an enlarged set of lips. An example of an alternative embodiment includes using the mechanisms described herein for a tongue or one or more teeth on the head 126, rather than the enlarged hand 120. For example, the figurine 100 can be configured to produce audio by moving an enlarged tongue. For example, the figurine 100 can be configured to produce audio by moving an enlarged tooth or set of teeth. An example of an alternative embodiment includes using the mechanisms described herein for the buttocks rather than the enlarged hand 120. For example, the figurine 100 can be configured to produce audio by bumping the buttocks.

An example of an alternative embodiment includes pushing an ear to active the audio. The ear can include an object on or over the ear, which can be pushed to activate the audio, such as, an ear ring, or a set of headphones. An example of an alternative embodiment includes pushing a nose to active the audio. An example of an alternative embodiment includes pushing an eye to active the audio. The eye can include an object on or over the eye, which can be pushed to activate the audio, such as, glasses, sunglasses, googles, a mask, a pirate eye patch, and the like.

An example of an alternative embodiment includes pushing any part of the head 126 to activate the audio, including but not limited to the cheeks, the eyes, the ears, the nose, the mouth, the tongue, the eyebrows, a unibrow, a beard, a mustache, a cap, a helmet, a ponytail, or a man-bun. An example of an alternative embodiment includes pushing any object on the figurine 100 to activate the audio, including but not limited to a watch on a wrist, a backpack on a back, a helmet on a head, a necklace or medallion around a neck, a shield carried on an arm or on a back, or a logo on a uniform or other piece of clothing.

In an alternative embodiment, the figurine 100 powers one or more lights, when the enlarged hand 120 is moved to active a signal to the controller 172, which then sends power to the lights. The power supply 178 can provide the power needed for the lights. In such an embodiment, the one or lights can be in addition to the audio. In one example, a display of lights changes with the activation of each of the different audio clips. In an example, a user can control the amount of time the lights are on. In an example, the figure 100 is holding a sign and the sign lights up when the enlarged hand 120 is moved to active a signal to the controller 172. The figurine 100 can be constructed to be glow in the dark. The figurine 100 can include a solar panel, which can be used to power the audio system 170. The figurine 100 can include a solar panel, which can be used to recharge the power supply 176. The figurine 100 can include a solar panel, which can be used to power lights, as described herein. The solar panel can be integrated into the figurine 100 so it is not noticeable and does not detract from the design of the figurine 100.

In some embodiments, the figurine 100 can be configured as a bobble head and a movement of the head 126 of the bobble head activates the audio. In some examples of these embodiments, the audio can only be activated if the head 126 of the bobble head is pushed straight down along a y-axis through the head 126. In other examples, the audio is activated randomly as the bobble head moves and touches a contact to activate the audio. In variations of these embodiments, the bobble movement can be place anywhere on the figurine 100. For example, the bobble movement can be place on the antis, hands, the feet, the legs, or the waist of the figurine 100, and such bobble movement activates the audio.

Figure 30:
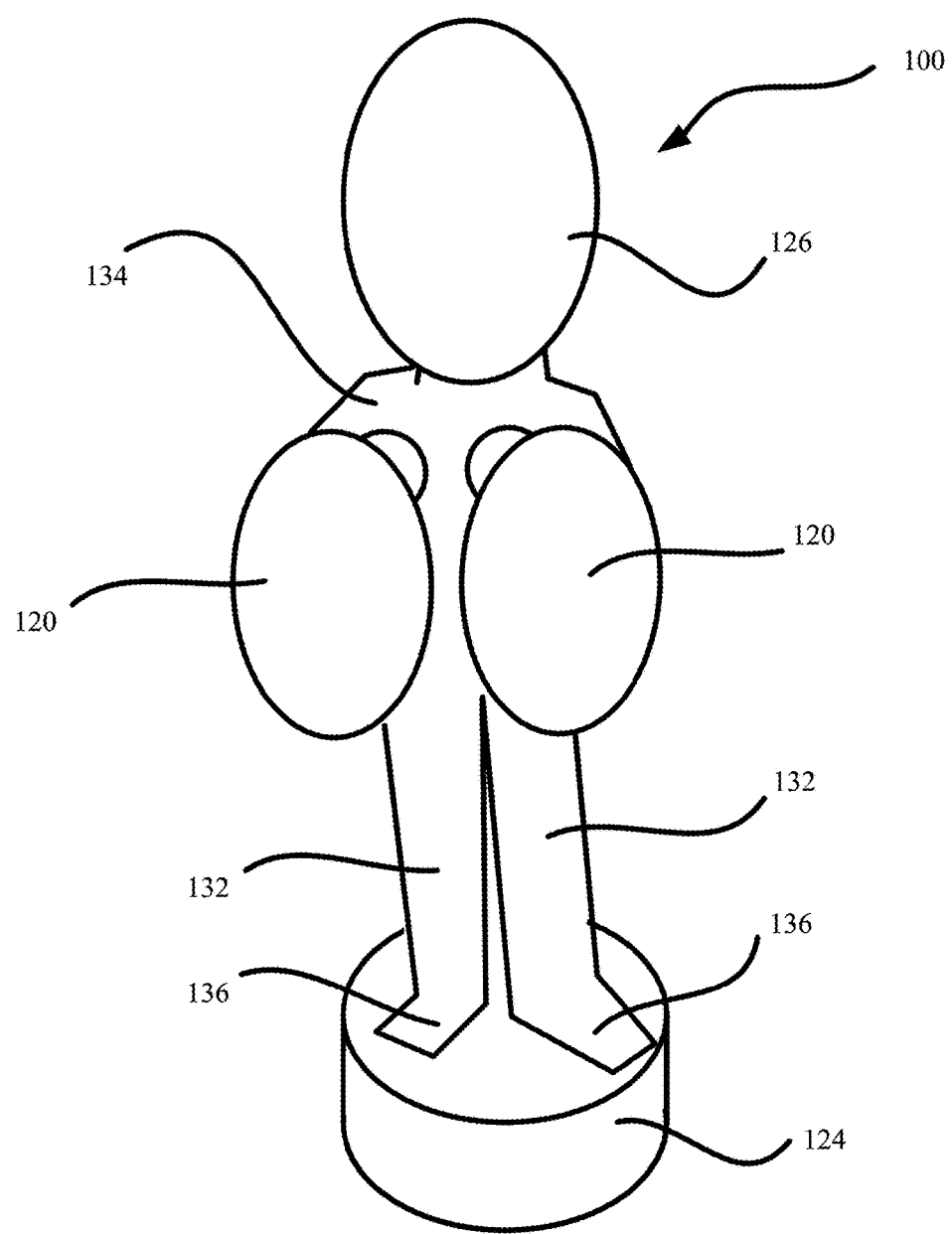
FIG. 30 is front view of an example of the figurine having two fists, in accordance with various embodiments.

Now flipping to FIG. 30, a front view of an example of an embodiment of the figurine 100 having two fists 120 is illustrated. In the two fist 120 configurations, each fist 120 is connected to the arm assembly 122, which moves mechanically, as illustrated, in FIGS. 15-19. For example, each fist 120 starts in a normal position (a ready position or a standby position, as illustrated in FIGS. 2-6. A force 140 (as indicated by the arrow) is applied to the front surface of one fist 120, which compresses the spring 158 and moves the one fist 120 towards the torso 134. Once the force 140 has moved the fist 120 by the distance of the travel 144 (as indicated by the arrow), the contact 160 is engaged, which signals the audio device 170 to play the audio. The one fist 120 is in an engaged position (a trigger position or an activation position), as illustrated in FIGS. 15-19, while the other fist 120 is in the normal position, as illustrated by FIGS. 2-6. Of course, the other fist 120 can be moved as described herein to activate the audio. As illustrated in FIG. 30, the lists 120 are shown as boxing gloves, however, such embodiments are not limited to boxing gloves, but rather, can be configured using the enlarged hand 120 or any of the other variations discussed herein. In addition, these embodiments can include a multi-input audio device, which accepts two or more signals to activate the audio or any other response, such as, for example, lights.

Figure 31:
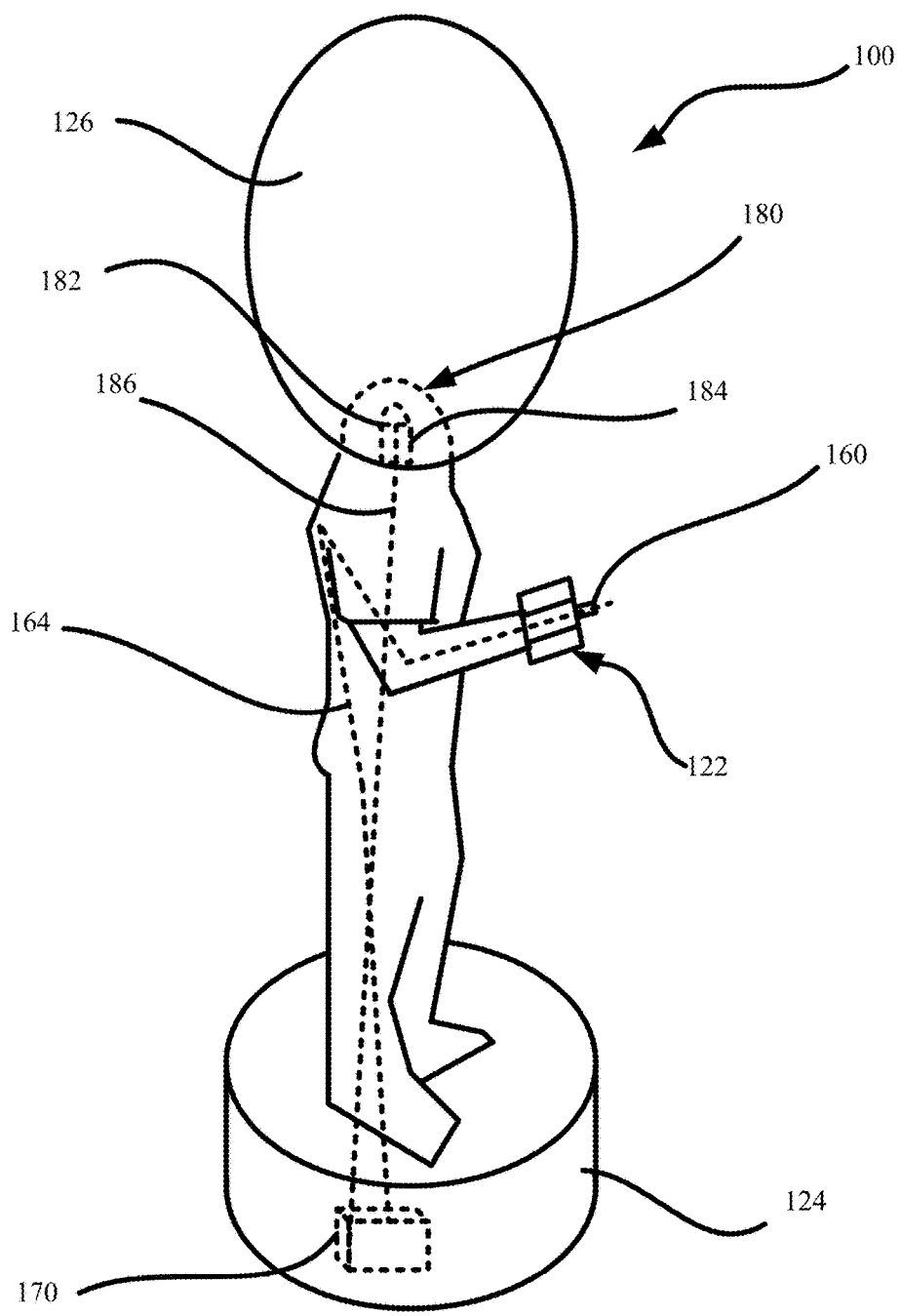
FIG. 31 is a side view from the left side of the figurine illustrating an example of a wiring diagram for two active sites, in accordance with various embodiments.

In FIG. 31, an example of a wiring diagram for multiple activation sites on the figurine 100 is illustrated. As discussed herein, the contact 160 is connected to wire pair 164, which is communication with an audio device 170. When the contact 160 is engaged, a signal is sent to the audio device 170, which activates the audio device 170. Similarly, a second wired pair 186 is connected to contact 182, which is in communication with audio device 170. When the contact 182 is engaged, a signal is sent to the audio device 170, which activates the audio device 170.

Figure 32:
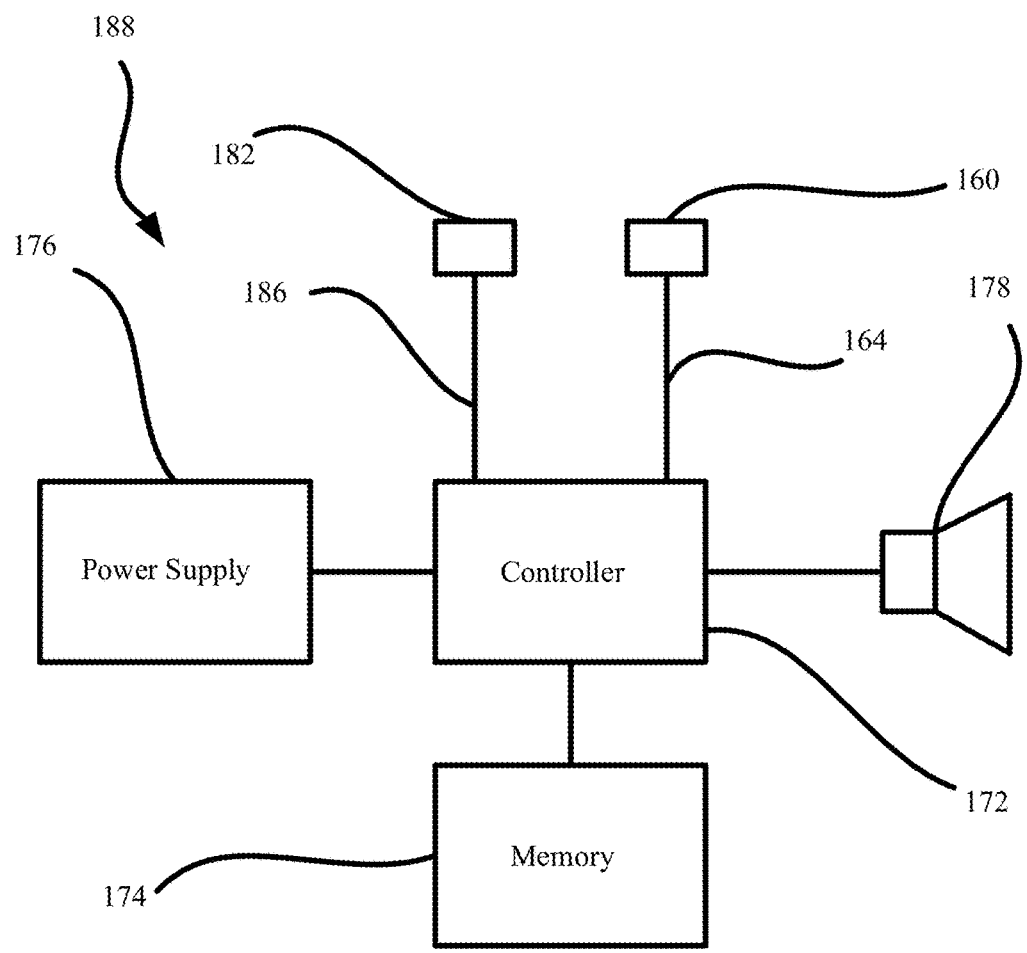
FIG. 32 is a block diagram illustrating an exemplary audio device configured to receive inputs for two active sites, in accordance with various embodiments.

In some configurations, the contact 160 and the contact 182 are in communication with a multi-input audio system 188, as illustrated in FIG. 32. In some embodiments, the second wired pair 186 and contact 182 is not interfaced to the head 126, but rather interfaced to a second fist 120, such as illustrated in FIG. 30. In some embodiments, the second wired pair 186 and contact 182 is not interfaced to the head 126, but rather interfaced another part of the body or to an object, as described herein. The figurine 100 can be configured with a third wire pair and a third contact (not in the drawings). The figurine 100 can be configured any multitude of wire pairs and contacts, which placed to active the audio system 170 from a polarity of body parts and/or objects on the figurine 100.

In an example of a bobble head, the head 126 has an arched chamber 180 and a rounded contact 182, which is mounted on a spacer 184. The radius of the arched chamber is similar to the radius of the rounded contact 182. In some embodiments, the radius of the arched chamber is the same as the radius of the rounded contact 182. The radius of the arched chamber is complementally to the radius of the rounded contact 182. When the bobble head is at an angle, the rounded contact 182 is engaged by movement of the head 126 downward, which places a portion of the arched chamber 180 onto the rounded contact 182. By using rounded shapes for the arched chamber 180 and the rounded contact 182, the rounded contact 182 can be engaged by the head 126 at any angle. Of course, some embodiments of the figurine 100 can be comprise a chamber 180 which is cylindrical in shape and a contact 182, which is a disk in shape. In an example of such an embodiment, the contact 182 can be engaged by pushing straight down along a y-axis through the head 126.

Turning to FIG. 32, exemplary components of the multi-input audio device 188 are illustrated in a block diagram. The audio device 188 can comprise a controller 172, a power supply 176, a memory 174, and a speaker 178. The first contact 160 is in communication with the controller 172 via the wire pair 164. The second contact 182 is in communication with the controller 172 via the wire pair 184. The memory 174 holds one or more audio clips. The controller 172 can play the audio clips in order or randomly, as described herein. The power supply 176 provides power to the controller 172, which can transfer power to any of the other components in the audio device 170.

Upon a triggering of one of the contact 160 or contact 182 by a user, a signal is sent to the controller 172 via the wire pair 164 or wire pair 184. The signal activates the controller 172 to access an audio clip from the memory 174 and play the audio clip through the speaker 178. In some configurations, the signal activate power to lights on the figurine 100. In some configurations, the triggering contact 160 activates the controller 170 to playa set of audio clips and triggering contact 182 activates the controller 170 to power lights on the figurine 100. In some configurations, the triggering contact 160 activates the controller 170 to play a different set of audio clips than the set of audio clips played by triggering contact 182.

In some embodiments, the power supply 176, the memory 174, the controller 172, and the speaker 178 are a single unit. Typically the speaker 178 is located in the pedestal 124. In some configurations, the speaker 178 is located in the torso 434 of the figurine 100. In certain configurations, the speaker 178 is located in a mouth of the figurine 100. In some embodiments, the audio device 188 has a communication port, which can be either wireless or wireable as described herein.

As used herein, the phrase "at least one of A, B, and C" can be construed to mean a logical (A or B or C), using a non-exclusive logical "or," however, can be contrasted to mean (A, B, and C), in addition, can be construed to mean (A and B) or (A and C) or (B and C). As used herein, the phrase "A, B and/or C" should be construed to mean (A, B, and C) or alternatively (A or B or C), using a non-exclusive logical "or."

The present invention has been described above with reference to various exemplary embodiments and examples, which are intended to be limiting in describing the full scope of systems and methods of this invention. However those skilled in the art will recognize that equivalent changes, modifications and variations of the embodiments, materials, systems, and methods may be made within the scope of the present invention, with substantially similar results, and are intended to be included within the scope of the present invention, as set forth in the following claims.

The invention claimed is:

1. A model figure comprising:
    a body comprising a pair of legs each of which is connected to a foot and a torso;
    a head connected to the body;
    a pedestal connected to at least one foot;
    an audio device inside of the pedestal;
    an arm connected to the torso;
    a glide connected to a distal end of the arm;
    a post connected to the guide, wherein the post extends from the guide and away from the arm;
    a contact on a distal end of the post, the contact in communication with the audio device;
    a spring surrounding the post and the contact, a length of the spring in an uncompressed state is longer than a total length of the post and the contact; and
    an oversized hand comprising a keyhole in a back of the hand, said keyhole configured to slide over the glide.

2. The model figure according to claim 1, wherein the oversized hand is configured as a fist.

3. The model figure according to claim 1, wherein the oversized hand is at least four times greater than an anatomically correct hand connected to the arm assembly.

4. The model figure according to claim 1, wherein the glide comprises at least one stabilizer and the keyhole is configured to accept the at least one stabilizer.

5. The model figure according to claim 1, further comprising at least one spring configured to connect the head to the body as a bobble head.

6. The model figure according to claim 1, further comprising one of a group consisting of a hockey stick, a helmet, a mask, a glove, a tennis racquet, a ping pong paddle, a golf club, and a baseball bat, which held by the oversized hand.

7. The model figure according to claim 1, further comprising:
    a second a glide connected to a distal end of the other arm on the body;
    a second post connected to the guide, wherein the second post extends from the second guide and away from the other arm;
    a second contact on a distal end of the second post, said second contact in communication with the audio device;
    a second spring surrounding the second post and the second contact, a length of the second spring in an uncompressed state is longer that a total length of the second post and the second contact; and
    a second oversized hand comprising a second keyhole in a back of the second hand, said second keyhole configured to slide over the second glide.

8. The model figure according to claim 7, wherein the second glide comprises at least one stabilizer and the second keyhole is configured to accept the at least one stabilizer.

9. The model figure according to claim 1, wherein the oversized hand is configured as a glove.

10. The model figure according to claim 9, wherein the glove is selected form the group comprising a hockey glove, a boxing glove, a baseball mitt, a golf glove, a snowboarding mitten, a mountain bike glove, and a mixed martial arts glove.

11. A method of providing a sound clip from a model figure, the method comprises:
    the step of providing the model figure comprising:
        an arm assembly;
        a glide on the end of the arm assembly, wherein a surface area of a cross-section of the glide is at least twice a surface area of the arm assembly, the glide further comprises a contact on a post and in communication with an audio device;
        an enlarged hand comprising a keyhole in the rear of the enlarged hand and configured to slide on the glide, wherein the enlarged hand is at least four times bigger proportionally as compared to a size of a hand that normally fits on the arm assembly; and
        a spring surrounding the post and preventing an inner wall of the keyhole from triggering the contact;
    the step of applying a force to a front surface of the enlarged hand;
    the step of compressing the spring; and
    the step of triggering the contact, wherein the contact sends a signal to an audio device,
    wherein the signal activates the audio device to provide an audio clip through a speaker in the model figure.

12. The method according to claim 11, wherein the model figure comprises:
    a second arm assembly;
    a second glide on the end of the second arm assembly, wherein a surface area of a cross-section of the second glide is at least twice a surface area of the second arm assembly, the second glide further comprises a second contact on a second post and in communication with the audio device;
    a second enlarged hand comprising a second keyhole in the rear of the second enlarged hand and configured to slide on the second glide, wherein the second enlarged hand is at least four times bigger proportionally as compared to a size of a hand that normally fits on the second arm assembly; and
    a second spring surrounding the second post and preventing an inner wall of the second keyhole from triggering the second contact.

13. The method according to claim 12, further comprising:
    the step of applying a force to a front surface of the second enlarged hand;
    the step of compressing the second spring; and
    the step of triggering the second contact, wherein the second contact sends a second signal to the audio device,
    wherein the second signal activates the audio device to provide an audio clip through the speaker in the model figure.

14. The method according to claim 11, wherein the enlarged hand is configured as a glove.

15. The method according to claim 14, wherein the glove is selected form the group comprising a hockey glove, a boxing glove, a baseball mitt, a golf glove, a snowboarding mitten, a mountain bike glove, and a mixed martial arts glove.

16. The method according to claim 11, wherein the model figure further comprises:
    a body comprising a pair of legs each of which is connected to a foot and a torso;
    the arm assembly coupled to the body;
    a head connected to the body, and
    at least one spring configured to connect the head to the body as a bobble head.

17. The method according to claim 11, wherein the model figure further comprises one of a group consisting of a hockey stick, a helmet, a mask, a glove, a tennis racquet, a ping pong paddle, a golf club, and a baseball bat, which held by the enlarged hand.

18. The method according to claim 11, wherein the force is equal to the spring stiffness multiplied by a distance traveled by the enlarged hand on the glide, wherein the spring stiffness is greater than zero and the distance is between 1 mm to 10 mm.

19. The method according to claim 11, wherein the audio device comprises a memory configured to store a plurality of audio clips.

20. The method according to claim 19, further comprising the steps of:
- providing an app downloadable to a smart device;
- downloading the app to the smart device;
- communicating with the audio device via the app loaded on the smart device; and
- downloading additional audio clips to the memory of the audio device through the app.

\* \* \* \* \*